US012659873B2

(12) United States Patent
Li et al.

(10) Patent No.: US 12,659,873 B2
(45) Date of Patent: Jun. 16, 2026

(54) UPLINK POWER CONTROL METHOD AND USER EQUIPMENT

(71) Applicant: TCL COMMUNICATION (NINGBO) CO., LTD., Ningbo (CN)

(72) Inventors: Tian Li, Ningbo (CN); Jia Sheng, Ningbo (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 353 days.

(21) Appl. No.: 18/546,988

(22) PCT Filed: Apr. 1, 2021

(86) PCT No.: PCT/CN2021/085101
§ 371 (c)(1),
(2) Date: Aug. 18, 2023

(87) PCT Pub. No.: WO2022/205373
PCT Pub. Date: Oct. 6, 2022

(65) Prior Publication Data
US 2024/0314704 A1 Sep. 19, 2024

(51) Int. Cl.
*H04W 52/24* (2009.01)
*H04W 52/14* (2009.01)

(52) U.S. Cl.
CPC ....... *H04W 52/242* (2013.01); *H04W 52/146* (2013.01)

(58) Field of Classification Search
CPC .. H04W 52/242; H04W 52/146; H04W 52/34
See application file for complete search history.

(56) References Cited

U.S. PATENT DOCUMENTS

2024/0196334 A1* 6/2024 Haghighat .......... H04W 52/285

FOREIGN PATENT DOCUMENTS

CN 110637485 A 12/2019
WO 2021027761 A1 2/2021

OTHER PUBLICATIONS

Vivo unpatentable over Enhancements on Multi-TRP for PDCCH, PUCCH and PUSCH, R1-2100422.*
Fraunhofer on beam management enhancements for multi-TRP, R1-2005784.*
ZTE Enhancements on Multi-TAP for PDCCH, PUCCH and PUSCH, R1-2100286.*
Nokia Enhancements for Multi-TAP URLLC schemes, R1-2101006.*
(Continued)

*Primary Examiner* — Zhitong Chen
(74) *Attorney, Agent, or Firm* — PV IP PC; Wei Te Chung

(57) ABSTRACT

An uplink power control method and a user equipment (UE) for multiple transmission and reception points (TRPs) is provided. The UE obtains a first uplink transmission power for a first transmission and reception point (TRP) at least based on a first downlink pathloss estimate associated with a first pathloss reference signal (PL-RS) resource index. The UE obtains a second uplink transmission power for a second TRP at least based on a second downlink pathloss estimate associated with a second PL-RS resource index. The UE transmits a first uplink transmission using the first uplink transmission power. The UE transmits a second uplink transmission using the second uplink transmission power.

18 Claims, 7 Drawing Sheets

(56) References Cited

OTHER PUBLICATIONS

European Search Report in European application No. 21934031. 2,mailed on Nov. 22, 2024.
Vivo: "Enhancements on Multi-TRP for PDCCH, PUCCH and PUSCH" 3GPP Draft: R1-2100422.
Fraunhofer Iis et al:"On beam management enhancements formulti-TRP" 3GPP Draft:R1-2005784.
Ericsson:"On PDCCH,PUCCH and PUSCH enhancements with multiple TRPs",3GPP Draft; R1-2009223.
Nokia et al: "Enhancements for Multi-TRP URLLC schemes" 3GPP Draft; R1-2101006.
International Search Report in International application No. PCT/CN2021/085101,mailed on Jan. 4, 2022.
Written Opinion of the International Search Authority in International application No. PCT/CN2021/085101,mailed on Jan. 4, 2022.
ZTE. "Discussion on UL power control for multi-panel operation" 3GPP TSG RAN WG1 Meeting #97, R1-1906250, May 17, 2019(May 17, 2019), section 2.1.
Huawei et al. "Enhancements on multi-TRP for reliability and robustness in Rel-17" 3GPP TSG RAN WG1 Meeting #104-e, R1-2100209, Feb. 5, 2021(Feb. 5, 2021), section 2.2.
ZTE. "3GPP TSG RAN WG1 Meeting #104-e, R1-2100286" Enhancements on Multi-TRP for PDCCH, PUCCH and PUSCH, Feb. 5, 2021(Feb. 5, 2021), section 2.2.3.
Lenovo et al. "3GPP TSG RAN WG1 Meeting #104-e, R1-2100274" Enhancements on Multi-TRP for PDCCH, PUCCH and PUSCH, Feb. 5, 2021(Feb. 5, 2021) section 4.3.
ZTE. "3GPP TSG RAN WG1 Meeting #95, R1-1812262" Discussion on UL power control for multi-panel operation, Nov. 16, 2018(Nov. 16, 2018), section 2.1.

* cited by examiner

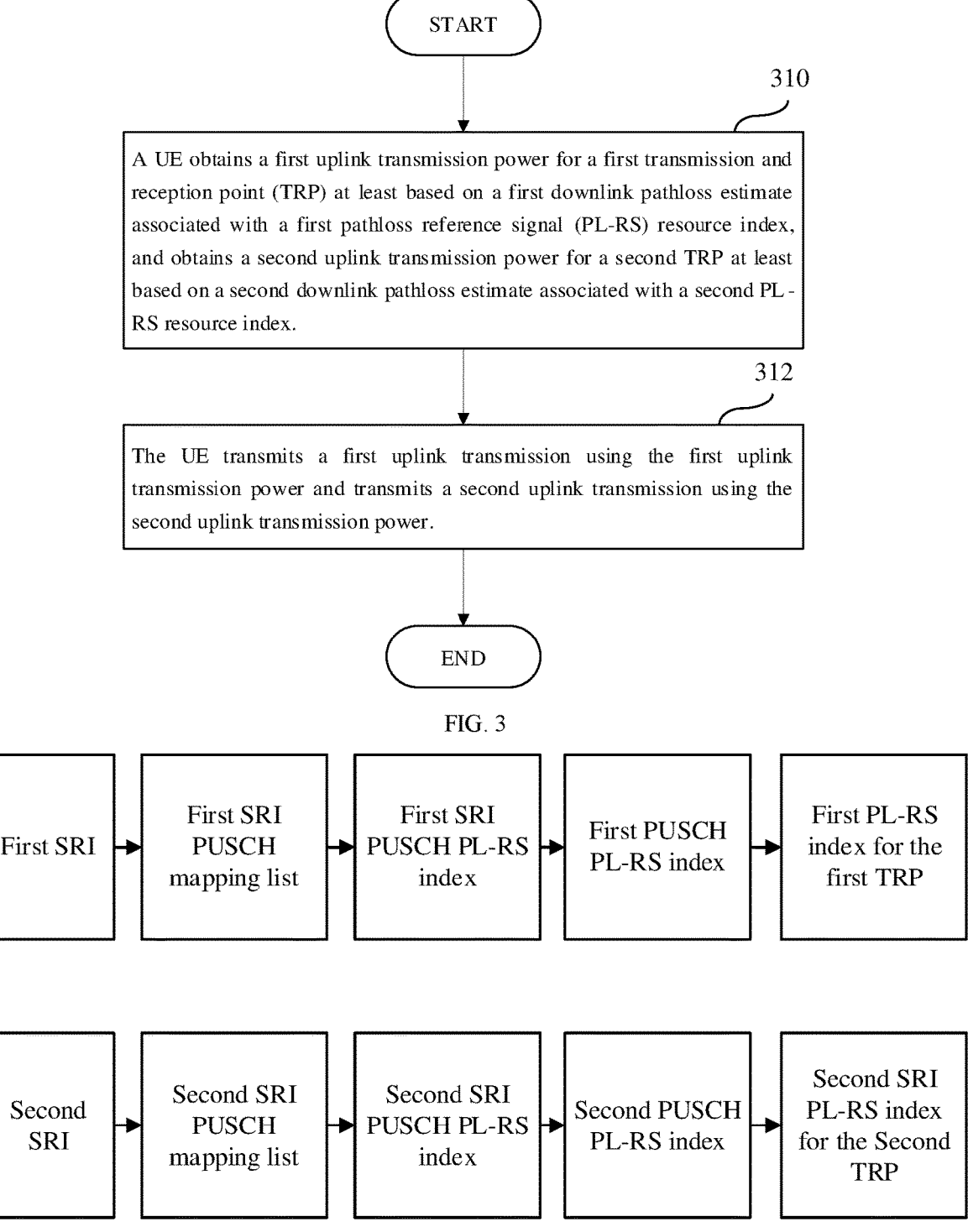

START

310

A UE obtains a first uplink transmission power for a first transmission and reception point (TRP) at least based on a first downlink pathloss estimate associated with a first pathloss reference signal (PL-RS) resource index, and obtains a second uplink transmission power for a second TRP at least based on a second downlink pathloss estimate associated with a second PL-RS resource index.

312

The UE transmits a first uplink transmission using the first uplink transmission power and transmits a second uplink transmission using the second uplink transmission power.

END

FIG. 3

| First SRI | → | First SRI PUSCH mapping list | → | First SRI PUSCH PL-RS index | → | First PUSCH PL-RS index | → | First PL-RS index for the first TRP |

| Second SRI | → | Second SRI PUSCH mapping list | → | Second SRI PUSCH PL-RS index | → | Second PUSCH PL-RS index | → | Second SRI PL-RS index for the Second TRP |

FIG. 4

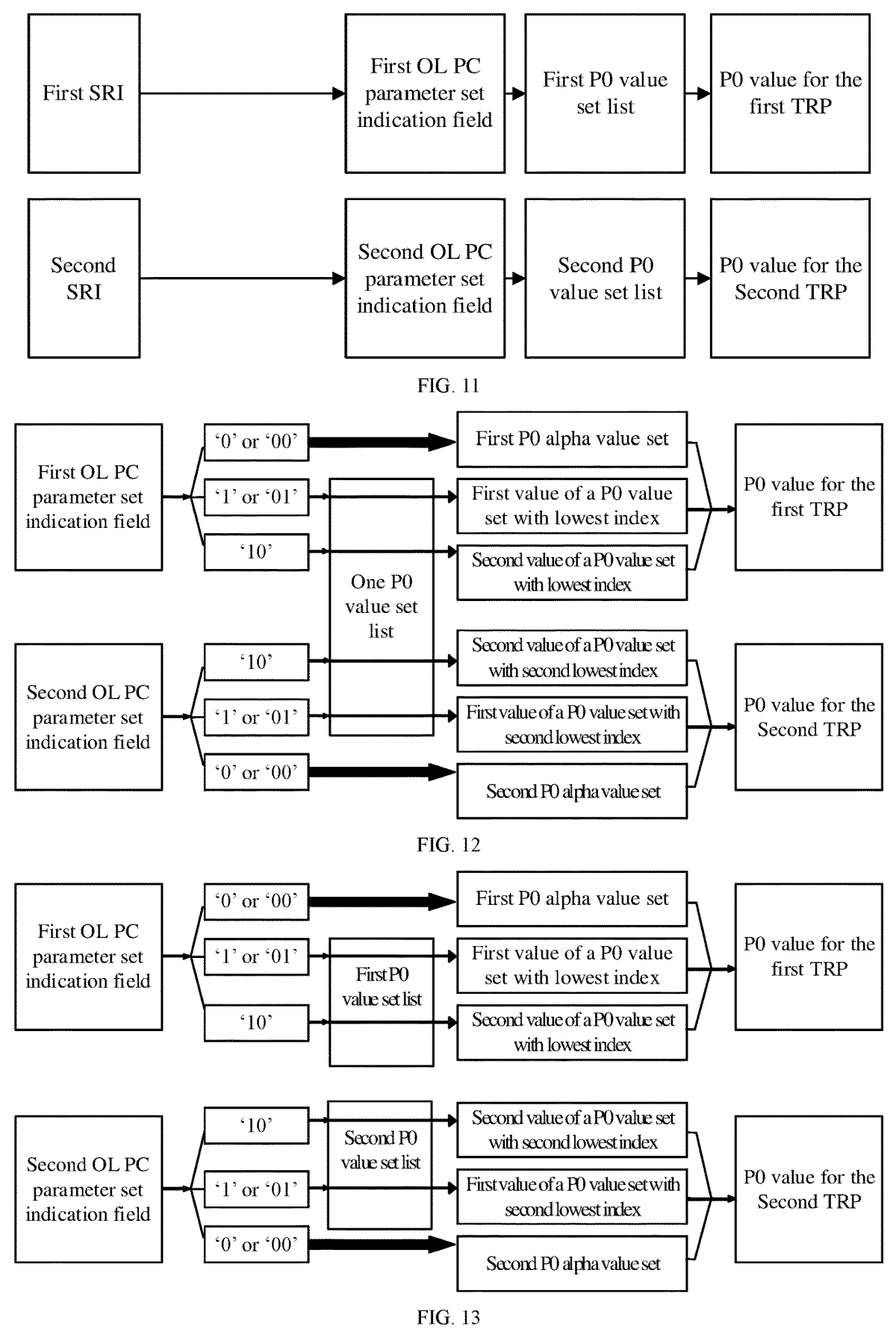

| First SRI | → | First OL PC parameter set indication field | → | First P0 value set list | → | P0 value for the first TRP |

| Second SRI | → | Second OL PC parameter set indication field | → | Second P0 value set list | → | P0 value for the Second TRP |

FIG. 11

First OL PC parameter set indication field
- '0' or '00' ⟶ First P0 alpha value set
- '1' or '01' → First value of a P0 value set with lowest index
- '10' → Second value of a P0 value set with lowest index One P0 value set list Second OL PC parameter set indication field
- '10' → Second value of a P0 value set with second lowest index
- '1' or '01' → First value of a P0 value set with second lowest index
- '0' or '00' ⟶ Second P0 alpha value set P0 value for the first TRP P0 value for the Second TRP

FIG. 12

First OL PC parameter set indication field
- '0' or '00' ⟶ First P0 alpha value set
- '1' or '01' → First value of a P0 value set with lowest index
- '10' → Second value of a P0 value set with lowest index First P0 value set list P0 value for the first TRP Second OL PC parameter set indication field
- '10' → Second value of a P0 value set with second lowest index
- '1' or '01' → First value of a P0 value set with second lowest index
- '0' or '00' ⟶ Second P0 alpha value set Second P0 value set list P0 value for the Second TRP

FIG. 13

UPLINK POWER CONTROL METHOD AND USER EQUIPMENT

CROSS REFERENCE TO RELATED APPLICATIONS

The disclosure is a US national phase application based upon an International Application No. PCT/CN2021/085101, filed on Apr. 1, 2021, titled "UPLINK POWER CONTROL METHOD AND USER EQUIPMENT", which is incorporated by reference in the present application in its entirety.

TECHNICAL FIELD

The present disclosure relates to the field of communication systems, and more particularly, to an uplink power control method and a user equipment for multiple transmission and reception points (TRPs).

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network. (E-UTRAN), for a mobile access network where one or more macro-cells are supported by a base station known as an eNodeB or eNB (evolved NodeB). More recently. LTE is evolving further towards the so-called 5G or NR (new radio) systems where one or more cells are supported by a base station known as a gNB.

To exploit multiple path propagation, multi-input multi-output (MIMO) is a method for multiplying the capacity of a radio link using multiple transmission and receiving antennas. By deploying multiple antennas at the transmitter and the receiver. MIMO realizes a practical technique for sending and receiving more than one data signal simultaneously over the same radio channel, which improves the performance of spectral efficiency greatly.

TECHNICAL PROBLEM

For physical uplink shared channel (PUSCH) repetitions in multi-TRP deployment, different TRPs sharing the same target uplink receiving power and the same path loss reference signal (PL-RS) may be inefficient.

When ultra-reliable and low latency communication (URLLC) transmissions collide with enhanced mobile broadband (eMBB) traffic from other UEs, power boosting URLLC transmissions by modifying a power value P0 is defined to control the open-loop (OL) power in case of collision. However, current multi-TRP based PUSCH repetitions cannot allow collision processing between URLLC and eMBB traffic at one of two TRPs.

To solve the potential issues for power control in multiple TRP/panel deployments, an improved uplink power control method is desired.

TECHNICAL SOLUTION

An object of the present disclosure is to propose an uplink power control method and a user equipment for multiple transmission and reception points (TRPs)

In a first aspect, an embodiment of the disclosure provides a user equipment (UE), comprising an uplink power control method executable in a user equipment (UE), comprising:

obtaining a first uplink transmission power for a first transmission and reception point (TRP) at least based on a first downlink pathloss estimate associated with a first pathloss reference signal (PL-RS) resource index;

obtaining a second uplink transmission power for a second TRP at least based on a second downlink pathloss estimate associated with a second PL-RS resource index;

transmitting a first uplink transmission using the first uplink transmission power; and transmitting a second uplink transmission using the second uplink transmission power.

In a second aspect, an embodiment of the disclosure provides a user equipment (UE) comprising a processer and a transceiver. The processor obtains a first uplink transmission power for a first transmission and reception point (TRP) at least based on a first downlink pathloss estimate associated with a first pathloss reference signal (PL-RS) resource index. The processor obtains a second uplink transmission power for a second TRP at least based on a second downlink pathloss estimate associated with a second PL-RS resource index. The processor directs the transceiver to transmit a first uplink transmission using the first uplink transmission power. The processor directs the transceiver to transmit a second uplink transmission using the second uplink transmission power.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as computer program product, that causes a computer to execute the disclosed method.

The disclosed method may be programmed as computer program, that causes a computer to execute the disclosed method.

ADVANTAGEOUS EFFECTS

An embodiment of the disclosure defines the PL-RS for CG and DG PUSCH.

An embodiment of the disclosure provides a method to update the mapping between SRI and PUSCH PL-RS.

An embodiment of the disclosure provides a method to determine the P0 value for open-loop power control.

An embodiment of the disclosure provides a method to determine bit width for open-loop (OL) power control (PC) parameter indication.

Regarding PUSCH PL-RS, the same PL-RS for the two TRPs cannot benefit from the increased diversity. The disclosure provides technical effects of obtaining PL-RSs for different TRPs separately. Regarding P0 value for open-loop power control, the same P0 value for the two TRPs cannot benefit from the increased diversity. The disclosure provides technical effects of obtaining P0 values for different TRPs separately. The disclosure realizes TRP-specific power control.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 3 is a schematic view showing an uplink power control method according to an embodiment of the disclosure.

FIG. 4 is a schematic view showing an example of determination of PL-RS for two TRPs using SRI related mappings.

FIG. 11 is a schematic view showing an example of determination of P0 values for two TRPs using two OL PC parameter set indication fields and two P0 value set lists with two SRI fields.

FIG. 12 is a schematic view showing an example of determination of P0 values for two TRPs using two OL PC parameter set indication fields and one P0 value set list with no SRI field.

FIG. 13 is a schematic view showing an example of determination of P0 values for two TRPs using two OL PC parameter set indication fields and two P0 value set lists with no SRI field.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For physical uplink shared channel (PUSCH) repetitions in multi-TRP deployment, the target receiving power for different TRPs may be different, and the path loss reference signals (PL-RS) for different TRPs for calculating path loss may be different. Hence, it is desirable that configuration of PUSCH PL-RS should be TRP specific. In this disclosure, various embodiments of the disclosed uplink power control method provide TRP specific PL-RS for configured grant (CG) and dynamic grant (DG) PUCSH transmission towards multi-TRPs. Additionally, embodiments of the disclosed method are provided to design TRP specific open-loop power control towards multi-TRP. Hence, power boosting of the two TRPs is proposed to be controlled separately.

Figure 1:
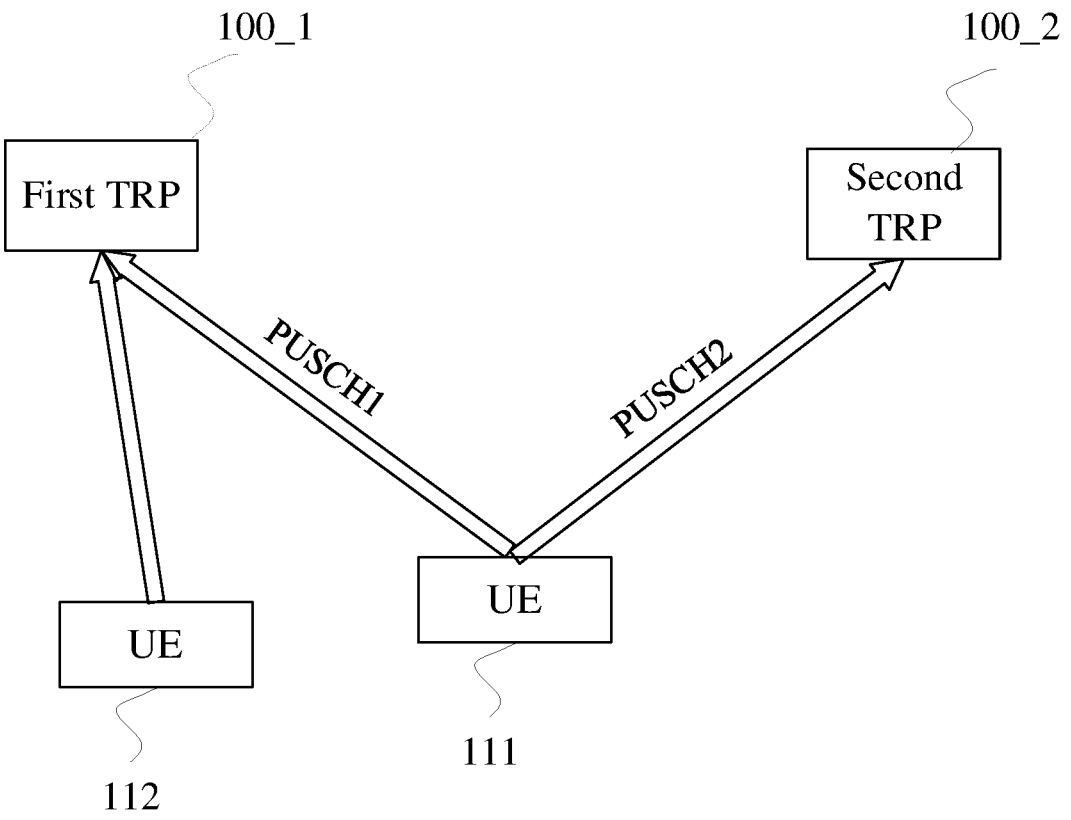
FIG. 1 is a schematic view showing a UE performing PUSCH repetition in a multi-TRP environment telecommunication system.

PUSCH Repetition in Multi-TRP/Panel Scenario:

As is shown in FIG. 1, for a UE 111 performing multi-TRP/panel transmission to a first TRP 100_1 and a second TRP 100_2 in new radio (NR). PUSCH repetition can be scheduled in different transmission occasions toward different TRPs. That is, the UE 111 has multiple chances to perform PUSCH transmission. PUSCH repetition targeting different TRPs can avoid possible blockage between a TRP and the UE, thus to enhance the reliability and coverage.

Figure 2:
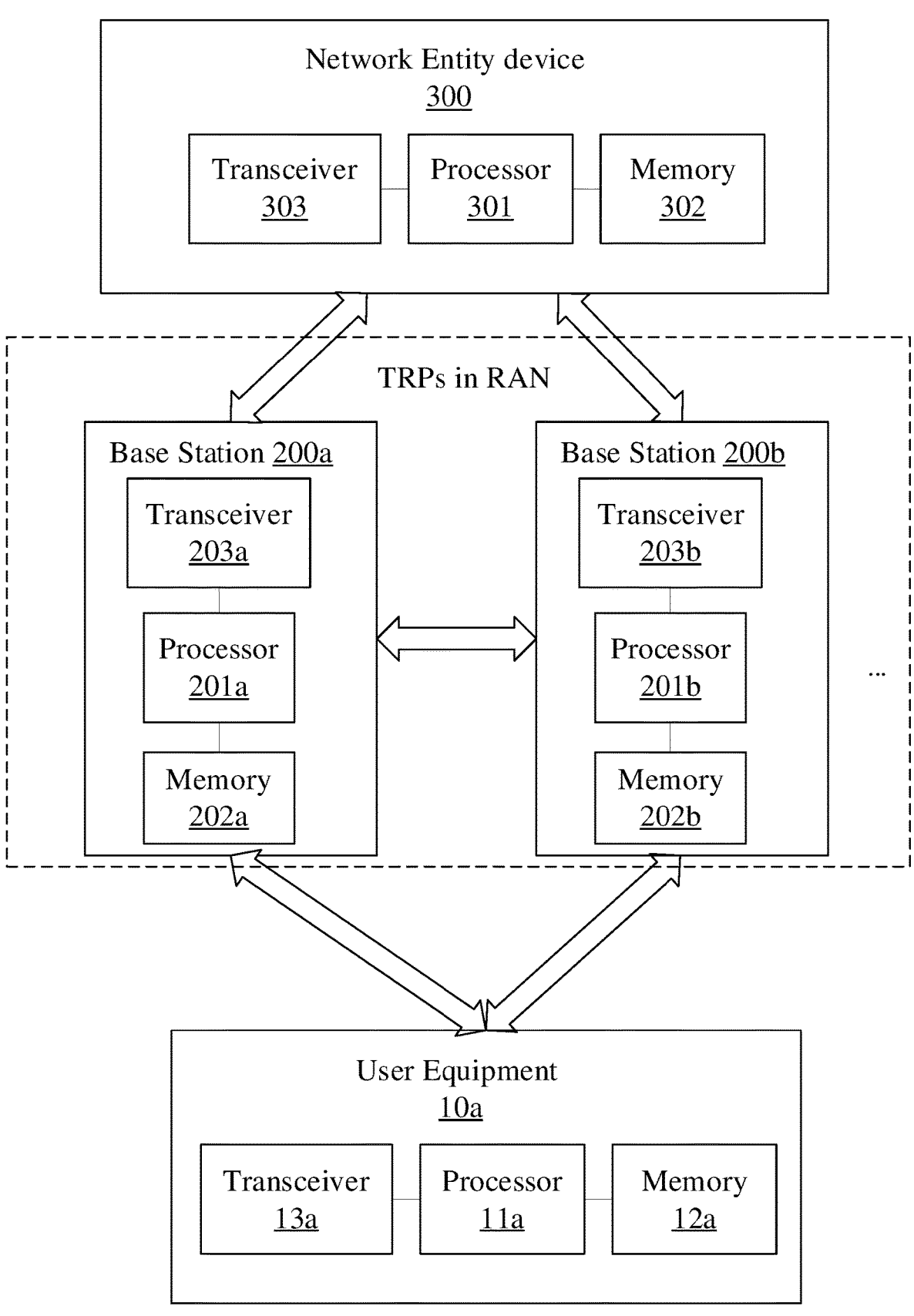
FIG. 2 is a schematic view showing a telecommunication system.

With reference to FIG. 2, an example of each of the UE 111 and UE 112 in the description may include the UE 10a. An example of the base station in the description may include the base station 200a or 200b. A first TRP and a second TRP in the description may comprise two radio nodes. The two radio nodes may be connected to one base station or two different base stations. Uplink (UL) transmission of a control signal or data may be a transmission operation from a UE to a base station. Downlink (DL) transmission of a control signal or data may be a transmission operation from a base station to a UE.

With reference to FIG. 2, a telecommunication system including a UE 10a, a base station 200a, a base station 200b, and a network entity device 300 executes the disclosed method according to an embodiment of the present disclosure. FIG. 2 is shown for illustrative not limiting, and the system may comprise more UEs. BSs, and CN entities. Connections between devices and device components are shown as lines and arrows in the FIGs. The UE 10a may include a processor 11a, a memory 12a, and a transceiver 13a. The base station 200a may include a processor 201a, a memory 202a, and a transceiver 203a. The base station 200b may include a processor 201b, a memory 202b, and a transceiver 203b. The network entity device 300 may include a processor 301, a memory 302, and a transceiver 303. Each of the processors 11*a*, 201*a*, 201*b*, and 301 may be configured to implement proposed functions, procedures, and/or methods described in this description. Layers of radio interface protocol may be implemented in the processors 11*a*, 201*a*, 201*b*, and 301. Each of the memory 12*a*, 202*a*, 202*b*, and 302 operatively stores a variety of programs and information to operate a connected processor. Each of the transceiver 13*a*, 203*a*, 203*b*, and 303 is operatively coupled with a connected processor, transmits and/or receives a radio signal. Each of the base stations 200*a* and 200*b* may be an eNB, a gNB, or one of other radio nodes.

Each of the processors 11*a*, 201*a*, 201*b*, and 301 may include a general-purpose central processing unit (CPU), application-specific integrated circuits (ASICs), other chipsets, logic circuits and/or data processing devices. Each of the memory 12*a*, 202*a*, 202*b*, and 302 may include read-only memory (ROM), a random access memory (RAM), a flash memory, a memory card, a storage medium and/or other storage devices. Each of the transceivers 13*a*, 203*a*, 203*b*, and 303 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 300 may be a node in a CN. CN may include LTE CN or 5GC which may include user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Single-DCI based multi-TRP PUSCH repetition and multiple-DCI based multi-TRP PUSCH repetition can be performed in multi-TRP/panel scenarios. Single-DCI based multi-TRP PUSCH repetition is beneficial when different TRPs are connected by ideal backhaul, while multiple-DCI based multi-TRP PUSCH repetition is beneficial when different TRPs are connected by non-ideal backhaul.

With reference to FIG. 3, a UE, such as the UE 111 in FIG. 1, may perform the disclosed uplink power control method. The UE obtains a first uplink transmission power for a first transmission and reception point (TRP) at least based on a first downlink pathloss estimate associated with a first pathloss reference signal (PL-RS) resource index, and obtains a second uplink transmission power for a second TRP at least based on a second downlink pathloss estimate associated with a second PL-RS resource index (block 310). The UE transmits a first uplink transmission using the first uplink transmission power and transmits a second uplink transmission using the second uplink transmission power (block 312). In an embodiment of the disclosure, the UE may obtain the first uplink transmission power based on a power P0 for the first TRP and the first downlink pathloss estimate, and obtain the second uplink transmission power based on a power P0 for the second TRP and the second downlink pathloss estimate.

PUSCH transmission can be dynamically scheduled by an UL grant in downlink control information (DCI). Additionally, PUSCH transmission can correspond to a configured grant type 1 or type 2. The configured grant type 1 PUSCH transmission is semi-statically configured and sent from a base station to the UE 111 in a higher layer parameter of a configured grant configuration (e.g. ConfiguredGrantConfig) including a configured UL grant parameter (e.g. rrc-ConfiguredUplinkGrant). The UE 111 may receive a configured grant type 1 without detecting an UL grant in a DCI. The configured grant type 2 PUSCH transmission is semi-persistently scheduled by an UL grant in a valid activation DCI and sent from a base station to the UE 111 in a higher layer parameter of the configured grant configuration (e.g. ConfiguredGrantConfig) not including a configured UL grant parameter (e.g. rrc-ConfiguredUplinkGrant). More than one configured grant configuration of configured grant type 1 and/or configured grant type 2 can be active at the same time in an active BWP of a serving cell.

Power Control for PUSCH:

In an embodiment of the invention, if the UE 111 transmits a PUSCH on active UL BWP b of a carrier f of a serving cell c using parameter set configuration with index j and PUSCH power control adjustment state with index l, the UE 111 determines the PUSCH transmission power $P_{PUSCH,b,f,c}(i,j,q_d,l)$ in PUSCH transmission occasion i as:

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10 \log_{10}\left(2^\mu \cdot M_{RB,b,f,c}^{PUSCH}(i)\right) + \alpha_{b,f,c}(j) \cdot PL_{b,f,c}(q_d) + \\ \Delta_{TF,b,f,c}(i) + f_{b,f,c}(i, l) \end{array} \right\} [\text{dBm}]$$

where $P_{CMAX,f,c}(i)$ is the UE configured maximum output power defined for the carrier f of the serving cell C in PUSCH transmission occasion i;

$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0,1, \ldots, J-1\}$ $$M_{RB,b,f,c}^{PUSCH}(i)$$

is the bandwidth of the PUSCH resource assignment expressed in a number of resource blocks for PUSCH transmission occasion i on active UL BWP b of the carrier f of serving cell c;

$\mu$ is an SCS configuration;

$\alpha_{b,f,c}(j)$ is an adjustment provided by a higher layer parameter alpha in p0-PUSCH-Alpha or P0-PUSCH-AlphaSet;

$PL_{b,f,c}(q_d)$ is a downlink pathloss estimate in dB calculated by the UE using path loss (PL) reference signal (RS) index $q_d$ for the active DL BWP;

$\Delta_{TF,b,f,c}(i)$ is a power adjustment determined by the higher layer parameter deltaMCS; and $f_{b,f,c}(i,l)$ is PUSCH power control adjustment state for active UL BWP b of the carrier f of serving cell C in transmission occasion i.

Design on PUSCH PL-RS:

For PUSCH repetitions in multi-TRP deployment, the target receiving powers for different TRPs are different, and the PL-RSs for different TRPs for calculating path loss are different. Hence, it is desirable that the configuration of PUSCH PL-RS is TRP specific.

Configuration of CG PUSCH PL-RS:

Presence of the Higher Layer Parameter of a Configured UL Grant:

For a CG PUSCH in single-TRP deployment, if a configured UL grant parameter (e.g. rrc-ConfiguredUplink- Grant) is included in a higher layer parameter of the configured grant configuration (e.g. ConfiguredGrantConfig), the PL-RS resource index $q_d$ is provided by a PL-RS index (e.g. pathlossReferenceIndex) included in the configured UL grant parameter (e.g. rrc-ConfiguredUplinkGrant). In this section, embodiments of the disclosed method provide TRP specific PL-RS for CG PUCSH transmission towards multi-TRPs. Table 1 shows information elements (IEs) and parameters related to the PL-RS index (e.g. pathlossReferenceIndex).

TABLE 1

```
ConfiguredGrantConfig ::=          SEQUENCE {
    frequencyHopping                       ENUMERATED {intraSlot, interSlot}
OPTIONAL, -- Need S
    cg-DMRS-Configuration          DMRS-UplinkConfig,
    mcs-Table                              ENUMERATED {qam256, qam64LowSE}
OPTIONAL, -- Need S
    mcs-Table TransformPrecoder        ENUMERATED {qam256, qam64LowSE}
OPTIONAL, -- Need S
    uci-OnPUSCH                            SetupRelease { CG-UCI-OnPUSCH }
OPTIONAL, -- Need M
    resourceAllocation                 ENUMERATED { resourceAllocationType0,
resourceAllocationType1, dynamicSwitch },
    rbg-Size                               ENUMERATED {config2}
OPTIONAL, -- Need S
    powerControlLoop ToUse         ENUMERATED {n0, n1},
    p0-PUSCH-Alpha                 P0-PUSCH-AlphaSetId,
    transformPrecoder                      ENUMERATED {enabled, disabled}
OPTIONAL, -- Need S
    nrofHARQ-Processes             INTEGER(1..16),
    repK                                   ENUMERATED {n1, n2, n4, n8},
    repK-RV                                ENUMERATED {s1-0231, s2-0303, s3-0000}
OPTIONAL, -- Need R
    periodicity                        ENUMERATED {
                                               sym2, sym7, symlx14, sym2x14,
sym4x14, sym5x14, sym8x14, sym10x14, sym16x14, sym20x14,
                                               sym32x14, sym40x14, sym64x14,
sym80x14, sym128x14, sym160x14, sym256x14, sym320x14, sym512x14,
                                               sym640x14,     sym1024x14,
sym1280x14, sym2560x14, sym5120x14,
                                               sym6, symlx12, sym2x12, sym4x12,
sym5x12, sym8x12, sym10x12, sym16x12, sym20x12, sym32x12,
                                               sym40x12, sym64x12, sym80x12,
sym128x12, sym160x12, sym256x12, sym320x12, sym512x12, sym640x12,
                                               sym1280x12, sym2560x12
    },
    configuredGrantTimer                                          INTEGER (1..64)
OPTIONAL, -- Need R
    rrc-ConfiguredUplinkGrant      SEQUENCE {
        timeDomainOffset                       INTEGER (0..5119),
        timeDomainAllocation                   INTEGER (0..15),
        frequencyDomainAllocation              BIT STRING (SIZE(18)),
        antennaPort                            INTEGER (0..31),
        dmrs-SeqInitialization                                    INTEGER (0..1)
OPTIONAL, -- Need R
        precodingAndNumberOfLayers             INTEGER (0..63),
        srs-ResourceIndicator                                     INTEGER (0..15)
OPTIONAL, -- Need R
        mcsAndTBS                              INTEGER (0..31),
        frequencyHoppingOffset                                    INTEGER (1..
maxNrofPhysicalResourceBlocks-1)                 OPTIONAL, -- Need R
        pathlossReferenceIndex                 INTEGER (0..maxNrofPUSCH-
PathlossReferenceRSs-1),
        . . . ,
        [[
        pusch-RepTypeIndicator-r16             ENUMERATED {pusch-RepTypeA,pusch-
RepTypeB}                          OPTIONAL, -- Need M
        frequencyHoppingPUSCH-RepTypeB-r16     ENUMERATED     {interRepetition,
interSlot}                         OPTIONAL,   -- Cond Rep TypeB
        time ReferenceSFN-r16                              ENUMERATED {sfn512}
OPTIONAL -- Need S
        ]]
}
```

(1) Radio Resource Control (RRC) Configuration:

In an embodiment of the invention, for multi-TRP based CG PUSCH repetition scheme, if a configured UL grant parameter (e.g. rrc-ConfiguredUplinkGrant) is included in a higher layer parameter of the configured grant configuration (e.g. ConfiguredGrantConfig), a second PL-RS index (e.g. pathlossReferenceIndex) can be added in a higher layer parameter of a configured UL grant (e.g. rrc-ConfiguredUplinkGrant) and the second PL-RS resource index $q_d$ is provided by this new parameter. In detail, a first PL-RS resource index $q_d$ corresponding to the first TRP is provided by a higher layer parameter of a first PL-RS index (e.g. pathlossReferenceIndex) in a higher layer parameter of a configured UL grant (e.g. rrc-ConfiguredUplinkGrant) of the configured grant configuration, where the first TRP corresponds to the first beam, i.e., the UE 111 transmits the CG PUSCH repetition toward the first TRP using the first beam. The second PL-RS resource index $q_d$ corresponding to the second TRP is provided by a higher layer parameter of a second PL-RS index (e.g. pathlossReferenceIndex) in the higher layer parameter of the configured UL grant (e.g. rrc-ConfiguredUplinkGrant) of the configured grant configuration, where the second TRP corresponds to the second beam, i.e., the UE 111 transmits the CG PUSCH repetition toward the second TRP using the second beam.

Additionally, if the second PL-RS index (e.g. pathlossReference Index) is added in the higher layer parameter of the configured UL grant (e.g. rrc-ConfiguredUplinkGrant), the first PL-RS index (e.g. pathlossReferenceIndex) and the second PL-RS index (e.g. pathlossReferenceIndex) can be used to indicate dynamic switching between single-TRP based CG PUSCH transmission and multi-TRP based CG PUSCH transmission.

(2) Configured by an Offset Value:

In an embodiment of the invention, for multi-TRP based CG PUSCH repetition scheme, if a configured UL grant parameter (e.g. rrc-ConfiguredUplinkGrant) is included in a higher layer parameter of the configured grant configuration (e.g. ConfiguredGrantConfig), the second PL-RS resource index q is an offset value starting from the first PL-RS resource index $q_d$ where the offset value is an integer and can be a pre-configured value or configured by a radio resource control (RRC) signal, a medium access control (MAC) control element (CE), and/or downlink control information (DCI). In detail, the first PL-RS resource index $q_d$ corresponding to the first TRP is provided by a higher layer parameter of a PL-RS index (e.g. pathlossReferenceIndex), where the first TRP corresponds to the first beam, i.e., the UE 111 transmits the CG PUSCH repetition toward the first TRP using the first beam. The second PL-RS resource index $q_d$ corresponding to the second TRP is provided by the offset value and the higher layer parameter of the PL-RS index (e.g. pathlossReferenceIndex), where the second TRP corresponds to the second beam, i.e., the UE 111 transmits the CG PUSCH repetition toward the second TRP using the second beam. In particular, if the offset value is equal to zero, the first PL-RS resource index is the same as the second PL-RS resource index.

Absence of the Higher Layer Parameter of a Configured UL Grant:

Presence of SRS Resource Indicator (SRI) Field:

For a CG PUSCH in single-TRP deployment, if a configured UL grant parameter (e.g. rrc-ConfiguredUplinkGrant) is not included in the higher layer parameter of the configured grant configuration (e.g. ConfiguredGrantConfig), the PL-RS resource index $q_d$ is determined according to a PUSCH PL-RS index (e.g. PUSCH-PathlossReferenceRS-Id), which is mapped to an SRS Resource Indicator (SRI) in a DCI activating the PUSCH transmission. Since the UE receives two SRI fields corresponding to two TRPs respectively, it is preferable to use these two SRIs to indicate the two PL-RS resources. With reference to 3GPP TS 38.212, an SRI field in DCI contains an SRS resource indicator (SRI). In this section, embodiments of the disclosed method provide TRP specific PL-RS for CG PUCSH transmission towards multi-TRP. Table 2 shows parameters related to SRI PUSCH PC (e.g. SRI-PUSCH-PowerControl).

TABLE 2

| | | |
|---|---|---|
| PUSCH-PowerControl ::= | SEQUENCE { | |
| tpc-Accumulation | | ENUMERATED { disabled } |
| OPTIONAL, -- Need S | | |
| msg3-Alpha | | Alpha |
| OPTIONAL, -- Need S | | |
| p0-Nominal WithoutGrant | | INTEGER (−202..24) |
| OPTIONAL, -- Need M | | |
| p0-AlphaSets | SEQUENCE (SIZE (1..maxNrofP0-PUSCH-AlphaSets)) OF | |
| P0-PUSCH-AlphaSet    OPTIONAL, -- Need M | | |
| pathlossReferenceRSToAddModList | SEQUENCE (SIZE (1..maxNrofPUSCH- | |
| PathlossReferenceRSs)) OF PUSCH-PathlossReferenceRS | | |
| OPTIONAL, -- Need N | | |
| pathlossReferenceRSToReleaseList | SEQUENCE (SIZE (1..maxNrofPUSCH- | |
| PathlossReferenceRSs)) OF PUSCH-PathlossReferenceRS-Id | | |
| OPTIONAL, -- Need N | | |
| twoPUSCH-PC-AdjustmentStates | | ENUMERATED {twoStates} |
| OPTIONAL, -- Need S | | |
| deltaMCS | | ENUMERATED {enabled} |
| OPTIONAL, -- Need S | | |
| sri-PUSCH-MappingToAddModList | SEQUENCE (SIZE (1..maxNrofSRI-PUSCH-Mappings)) | |
| OF SRI-PUSCH-PowerControl | | |
| OPTIONAL, -- Need N | | |
| sri-PUSCH-MappingToReleaseList | SEQUENCE (SIZE (1..maxNrofSRI-PUSCH-Mappings)) | |
| OF SRI-PUSCH-PowerControlId | | |
| OPTIONAL -- Need N | | |
| } | | |
| P0-PUSCH-AlphaSet ::= | SEQUENCE { | |
| p0-PUSCH-AlphaSetId | , | |
| p0 | | INTEGER (−16..15) |

TABLE 2-continued

```
OPTIONAL, -- Need S
    alpha
OPTIONAL -- Need S
    }
P0-PUSCH-AlphaSetId ::=            INTEGER (0..maxNrofP0-PUSCH-AlphaSets-1)
```

(1) Single SRI PUSCH Mapping List:

To reduce signaling overhead, if a second SRI PUSCH PL-RS index (e.g. sri-PUSCH-PathlossReferenceRS-Id) is added in a higher layer parameter of SRI PUSCH PC (e.g. SRI-PUSCH-PowerControl) from a single SRI PUSCH mapping list (e.g. sri-PUSCH-Mapping ToAddModList), the two PL-RS resources can be determined by two higher layer parameters of SRI PUSCH PL-RS index (e.g. sri-PUSCH-PathlossReferenceRS-Id) that are mapped to two SRI fields respectively. By this way, these two SRI fields may be mapped to the same higher layer parameter of SRI PUSCH PC index (e.g. SRI-PUSCH-PowerControlId) (i.e. the same SRI-PUSCH-PowerControl).

In an embodiment of the invention, for multi-TRP based CG PUSCH repetition scheme configured by a higher layer The second PL-RS resource index $q_d$ corresponding to the second TRP is provided by a higher layer parameter of a second PUSCH PL-RS index (e.g. PUSCH-PathlossReferenceRS-Id) that is mapped to the second SRI PUSCH PL-RS index (e.g. sri-PUSCH-PathlossReferenceRS-Id) in the higher layer parameter of SRI PUSCH PC (e.g. SRI-PUSCH-PowerControl), where the second TRP corresponds to the second beam, i.e., the UE 111 transmits the CG PUSCH repetition toward the second TRP using the second beam. Table 3 shows the SRI PUSCH PL-RS index and PUSCH PL-RS index in higher layer and the mapping between these two indexes, that is, a mapping between the parameter sri-PUSCH-PathlossReferenceRS-Id in SRI-PUSCH-PowerControl and the parameter pusch-Pathloss-ReferenceRS-Id in PUSCH-PathlossReferenceRS.

TABLE 3

Element of PL-RS of higher layer

```
PUSCH-PathlossReferenceRS ::=      SEQUENCE {
    pusch-PathlossReferenceRS-Id        PUSCH-PathlossReferenceRS-Id,
    referenceSignal                     CHOICE {
        ssb-Index                           SSB-Index,
        csi-RS-Index                        NZP-CSI-RS-ResourceId
    }
}
PUSCH-PathlossReferenceRS-r16 ::=  SEQUENCE {
    pusch-PathlossReferenceRS-Id-r16    PUSCH-PathlossReferenceRS-Id-v1610,
    referenceSignal-r16                 CHOICE {
        ssb-Index-r16                       SSB-Index,
        csi-RS-Index-r16                    NZP-CSI-RS-ResourceId
    }
}
PUSCH-PathlossReferenceRS-Id ::=    INTEGER (0..maxNrofPUSCH-PathlossReferenceRSs-1)
PUSCH-PathlossReferenceRS-Id-v1610        ::=      INTEGER        (maxNrofPUSCH-
PathlossReferenceRSs..maxNrofPUSCH-PathlossReferenceRSs-1-r16)
SRI-PUSCH-PowerControl ::=          SEQUENCE {
    sri-PUSCH-PowerControlId            ,
    sri-PUSCH-PathlossReferenceRS-Id    PUSCH-PathlossReferenceRS-Id,
    sri-P0-PUSCH-AlphaSetId             P0-PUSCH-AlphaSetId,
    sri-PUSCH-ClosedLoopIndex           ENUMERATED { i0, i1 }
}
``` parameter of the configured grant configuration (e.g. ConfiguredGrantConfig) that does not include a configured UL grant parameter (e.g. rrc-ConfiguredUplinkGrant), if two SRI fields are included in a DCI activating the CG PUSCH transmission, and a second SRI PUSCH PL-RS index (e.g. sri-PUSCH-PathlossReferenceRS-Id) is added in a higher layer parameter of SRI PUSCH PC (e.g. SRI-PUSCH-PowerControl), the second PL-RS resource index $q_d$ can be determined by this new parameter. In detail, the first PL-RS resource index $q_d$ corresponding to the first TRP is provided by a higher layer parameter of a first PUSCH PL-RS index (e.g. PUSCH-PathlossReferenceRS-Id) that is mapped to the first SRI PUSCH PL-RS index (e.g. sri-PUSCH-Pathloss-ReferenceRS-Id) in the higher layer parameter of SRI PUSCH PC (e.g. SRI-PUSCH-PowerControl), where the first TRP corresponds to the first beam, i.e., the UE 111 transmits the CG PUSCH repetition toward the first TRP using the first beam.

(2) Two SRI PUSCH Mapping Lists:

As is shown in FIG. 4, the UE may determine the PL-RS for the two TRPs using SRI related mappings.

To schedule flexibly, if a second SRI PUSCH mapping list (e.g. sri-PUSCH-Mapping ToAddModList) is added in the higher layer parameter PUSCH-PowerControl, the two PL-RS resources can be determined by two higher layer parameters of SRI PUSCH PL-RS index (e.g. sri-PUSCH-Path-lossReferenceRS-Id) in two SRI PUSCH mapping lists (e.g. sri-PUSCH-Mapping ToAddModList) respectively. By this way, each SRI field can be mapped to a higher layer parameter of SRI PUSCH PC (e.g. SRI-PUSCH-PowerControl) in a separate higher layer parameter of SRI PUSCH mapping list (e.g. sri-PUSCH-Mapping ToAddModList).

In an embodiment of the invention, for multi-TRP based CG PUSCH repetition scheme configured by a higher layer parameter of the configured grant configuration (e.g. ConfiguredGrantConfig) that does not include a configured UL grant parameter (e.g. rrc-ConfiguredUplinkGrant), if two SRI fields are included in a DCI activating the CG PUSCH transmission and a second SRI PUSCH mapping list (e.g. sri-PUSCH-MappingToAddModList) is added in the higher layer parameter of PUSCH PC information element (IE) (e.g. PUSCH-PowerControl), the second PL-RS resource index $q_d$ can be determined by a higher layer parameter of SRI PUSCH PL-RS index (e.g. sri-PUSCH-PathlossReferenceRS-Id) in this new parameter. The two SRI fields comprise a first SRI field and a second SRI field.

In detail, the first PL-RS resource index $q_d$ corresponding to the first TRP is provided by a higher layer parameter of a first PUSCH PL-RS index (e.g. PUSCH-PathlossReferenceRS-Id) that is mapped to a higher layer parameter of a first SRI PUSCH PL-RS index (e.g. sri-PUSCH-PathlossReferenceRS-Id) in a higher layer parameter of a first SRI PUSCH mapping list (e.g. sri-PUSCH-Mapping ToAddModList), where the first SRI PUSCH PL-RS index (e.g. sri-PUSCH-PathlossReferenceRS-Id) is mapped to an SRI in the first SRI field, and the first TRP corresponds to the first beam, i.e., the UE 111 transmits the CG PUSCH repetition toward the first TRP using the first beam.

The second PL-RS resource index $q_d$ corresponding to the second TRP is provided by a higher layer parameter of a second PUSCH PL-RS index (e.g. PUSCH-PathlossReferenceRS-Id) that is mapped to a higher layer parameter of a second SRI PUSCH PL-RS index (e.g. sri-PUSCH-PathlossReferenceRS-Id) in a higher layer parameter of a second SRI PUSCH mapping list (e.g. sri-PUSCH-MappingToAddModList), where the second SRI PUSCH PL-RS index (e.g. sri-PUSCH-PathlossReferenceRS-Id) is mapped to an SRI in the second SRI field, and the second TRP corresponds to the second beam, i.e., the UE 111 transmits the CG PUSCH repetition toward the second TRP using the second beam.

(3) Through the Added Sounding Reference Signal (SRS) Resource Set ID:

Since two SRI fields corresponding to two SRS resource sets, if SRS resource set ID is added in the higher layer parameter of SRI PUSCH PC (e.g. SRI-PUSCH-PowerControl), the PL-RS resource can be determined by the SRI and the corresponding SRS resource set ID.

In an embodiment of the invention, for multi-TRP based CG PUSCH repetition scheme configured by a higher layer parameter of the configured grant configuration (e.g. ConfiguredGrantConfig) that does not include a configured UL grant parameter (e.g. rrc-ConfiguredUplinkGrant), if two SRI fields are included in a DCI activating the CG PUSCH transmission and a parameter of SRS resource set ID is added in a higher layer parameter of SRI PUSCH PC (e.g. SRI-PUSCH-PowerControl), each PL-RS resource index $q_d$ can be determined by the PUSCH PL-RS index (e.g. PUSCH-PathlossReferenceRS-Id) that is mapped to a higher layer parameter of SRI PUSCH PL-RS index (e.g. sri-PUSCH-PathlossReferenceRS-Id) determined by the SRI and the SRS resource set ID. The two SRI fields comprise a first SRI field and a second SRI field.

In detail, the first PL-RS resource index $q_d$ corresponding to the first TRP is provided by a higher layer parameter of a first PUSCH PL-RS index (e.g. PUSCH-PathlossReferenceRS-Id) that is mapped to a higher layer parameter of a first SRI PUSCH PL-RS index (e.g. sri-PUSCH-PathlossReferenceRS-Id), where the first SRI PUSCH PL-RS index (e.g. sri-PUSCH-PathlossReferenceRS-Id) is determined according to the SRI in the first SRI field and a first SRS resource set ID. The first TRP corresponds to the first beam, i.e., the UE 111 transmits the CG PUSCH repetition toward the first TRP using the first beam.

The second PL-RS resource index $q_d$ corresponding to the second TRP is provided by a higher layer parameter of a second PUSCH PL-RS index (e.g. PUSCH-PathlossReferenceRS-Id) that is mapped to a higher layer parameter of a second SRI PUSCH PL-RS index (e.g. sri-PUSCH-PathlossReferenceRS-Id), where the second SRI PUSCH PL-RS index (e.g. sri-PUSCH-PathlossReferenceRS-Id) is determined according to the SRI in the second SRI field and a second SRS resource set ID. The second TRP corresponds to the second beam, i.e., the UE 111 transmits the CG PUSCH repetition toward the second TRP using the second beam.

Absence of the SRI Field:

For a CG type 1 PUSCH transmission or a CG type 2 PUSCH transmission activated by a DCI that does not include an SRI field, the PL-RS for two TRPs can be set default. Since a second SRI PUSCH mapping list (e.g. sri-PUSCH-MappingToAddModList) may be added, two embodiments of the disclosed method provide TRP specific PL-RS for CG PUCSH transmission towards multi-TRP.

(1) One SRI PUSCH Mapping List:

In an embodiment of the invention, for multi-TRP based CG type 1 PUSCH repetition scheme configured by a higher layer parameter of the configured grant configuration (e.g. ConfiguredGrantConfig) that does not include a configured UL grant parameter (e.g. rrc-ConfiguredUplinkGrant), or CG type 2 PUSCH repetition scheme activated by a DCI that does not include an SRI field, if only one SRI PUSCH mapping list (e.g. sri-PUSCH-Mapping ToAddModList) is included in the higher layer parameter of PUSCH PC information element (IE) (e.g. PUSCH-PowerControl), the first PL-RS resource index $q_d$ corresponding to the first TRP is provided by a higher layer parameter of a first PUSCH PL-RS index (e.g. PUSCH-PathlossReferenceRS-Id) mapped to a higher layer parameter of a first SRI PUSCH PC index (e.g. SRI-PUSCH-PowerControlId) being equal to 0, and the second PL-RS resource index $q_d$ corresponding to the second TRP is provided by a higher layer parameter of a second PUSCH PL-RS index (e.g. PUSCH-PathlossReferenceRS-Id) mapped to a higher layer parameter of a second SRI PUSCH PC index (e.g. SRI-PUSCH-PowerControlId) being equal to 1, where the first and second TRP corresponds to the first and second beam respectively, i.e., the UE 111 transmits the CG PUSCH repetition toward the first TRP using the first beam or the second TRP using the second beam.

(2) Two SRI PUSCH Mapping Lists:

In an embodiment of the invention, for multi-TRP based CG type 1 PUSCH repetition scheme configured by a higher layer parameter of the configured grant configuration (e.g. ConfiguredGrantConfig) that does not include a configured UL grant parameter (e.g. rrc-ConfiguredUplinkGrant) or CG type 2 PUSCH repetition scheme activated by a DCI that does not include an SRI field, if two SRI PUSCH mapping lists (e.g. sri-PUSCH-MappingToAddModList) are included in a higher layer parameter of a PUSCH PC information element (IE), the first PL-RS resource index $q_d$ corresponding to the first TRP is provided by a higher layer parameter of a first PUSCH PL-RS index (e.g. PUSCH-PathlossReferenceRS-Id) mapped to a higher layer parameter of a first SRI PUSCH PC index (e.g. SRI-PUSCH-PowerControlId) being equal to 0 in a higher layer parameter of a first SRI PUSCH mapping list (e.g. sri-PUSCH-Mapping ToAddModList) and the second PL-RS resource index $q_d$ corresponding to the second TRP is provided by a higher layer parameter of a second PUSCH PL-RS index (e.g. PUSCH-PathlossReferenceRS-Id) mapped to a higher layer parameter of a second SRI PUSCH PC index (e.g. SRI-PUSCH- PowerControlId) being equal to 0 in a higher layer parameter of a second SRI PUSCH mapping list (e.g. sri-PUSCH-Mapping ToAddModList), where the first and second TRP corresponds to the first and second beam respectively, i.e., the UE 111 transmits the CG PUSCH repetition toward the first TRP using the first beam or the second TRP using the second beam.

Figures 5, 6, 7:
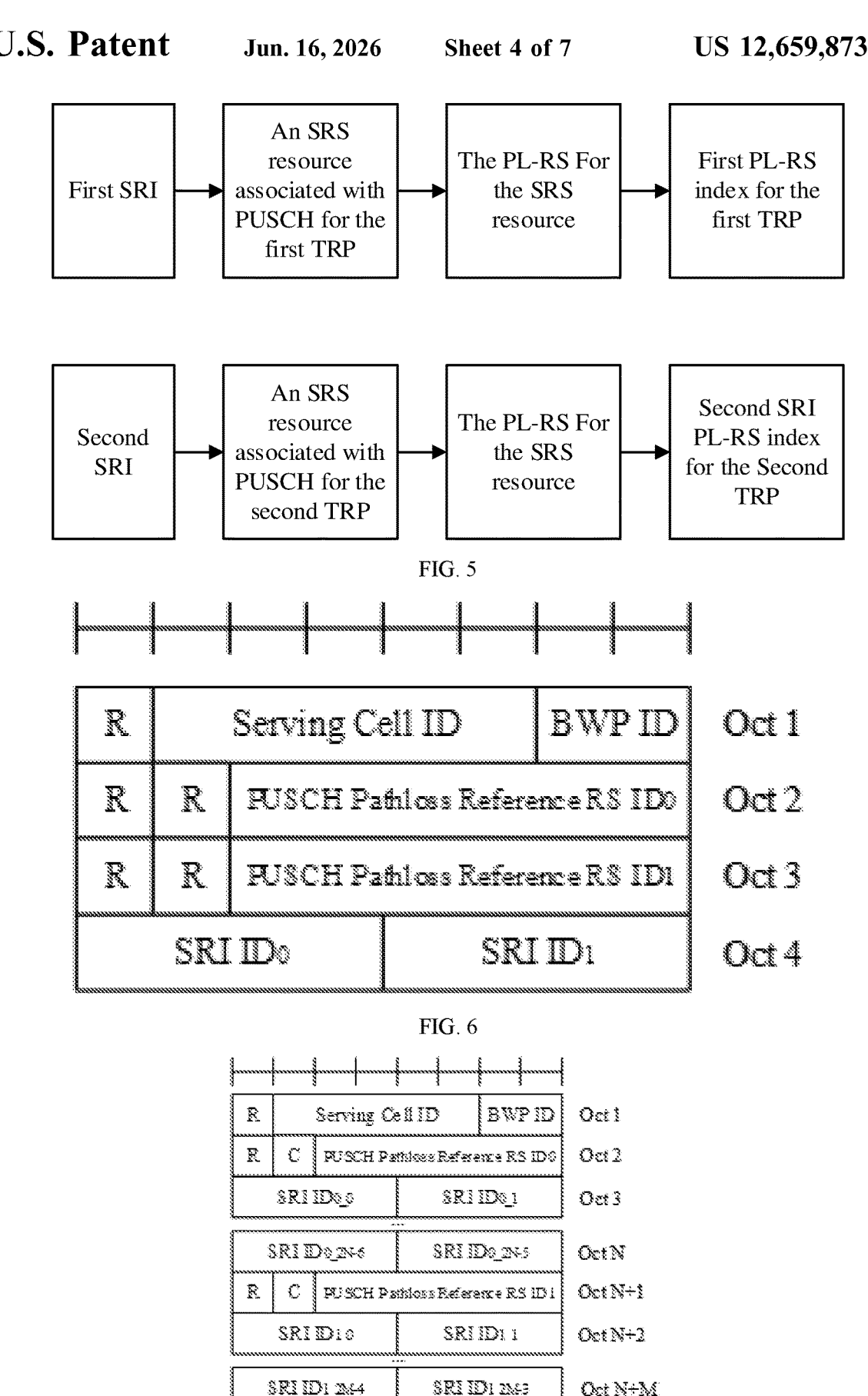
FIG. 5 is a schematic view showing an example of determination of PL-RS for two TRPs using sounding reference signal (SRS) resource related mappings.
FIG. 6 is a schematic view showing an example of a medium access control (MAC) control element (CE) with a single SRI mapping to a PUSCH PL-RS.
FIG. 7 is a schematic view showing an example of a MAC CE with multiple SRI identifiers mapping to one PUSCH PL-RS.

Configuration of DG PUSCH PL-RS:

Without Configuration of PUSCH PL-RS:

As is shown in FIG. 5, the PL-RS for the two TRPs are determined using SRS resource related mappings.

For PUSCH scheduled by DCI format 0_1/0_2, if a higher layer configuration of PUSCH PL-RS is not provided. TRP specific PUCSH PL-RS should be designed.

(1) Based on Two SRIs:

Since two SRI fields corresponding to two SRS resource sets are included in DCI and each SRI field indicates SRI per TRP, it is desirable that the PL-RS for PUSCH transmission targeting a specific TRP scheduled by DCI is determined according to the PL-RS of SRS resources associated with an SRI in the SRI field corresponding to the specific TRP.

In an embodiment of the invention, for multi-TRP based PUSCH repetition, if the PUSCH transmission is not scheduled by DCI format 0_0, and if the UE 111 is provided with a higher layer parameter of default beam switching for SRS (e.g. enableDefaultBeamPL-ForSRS) and is not provided with a higher layer parameter of PUSCH PL-RS (e.g. PUSCH-PathlossReferenceRS and PUSCH-PathlossReferenceRS-r16), the first PUSCH PL-RS resource index $q_d$ corresponding to the first TRP is the same as a PL-RS for an SRS resource set indicated by an SRI of a first SRI field, where the SRS resource set includes an SRS resource associated with the PUSCH transmission targeting the first TRP. The first TRP corresponds to the first beam, i.e., the PUSCH repetition transmits toward the first TRP using the first beam. The second PUSCH PL-RS resource index $q_d$ corresponding to the second TRP is the same as a PL-RS for an SRS resource set indicated by an SRI of a second SRI field, where the SRS resource set includes an SRS resource associated with the PUSCH transmission targeting the second TRP. The second TRP corresponds to the second beam, i.e., the UE 111 transmits the PUSCH repetition toward the second TRP using the second beam.

(2) Based on the SRS Resource Set with the Lowest Index:

To simplify the process of determining the PUSCH PL-RS, it is straightforward to use the PL-RS for the SRS resource set with the lowest index.

In an embodiment of the invention, for multi-TRP based PUSCH repetition, if the PUSCH transmission is not scheduled by DCI format 0_0, and if the UE 111 is provided a higher layer parameter of default beam switching for SRS (e.g. enableDefaultBeamPL-ForSRS) and is not provided a higher layer parameter of PUSCH PL-RS (e.g. PUSCH-PathlossReferenceRS and PUSCHPathlossReferenceRS-r16), the first PUSCH PL-RS resource index $q_d$ corresponding to the first TRP is the same as a PL-RS for an SRS resource set with the lowest index, where the first TRP corresponds to the first beam, i.e., the UE 111 transmits the PUSCH repetition toward the first TRP using the first beam, and the second PUSCH PL-RS resource index $q_d$ corresponding to the second TRP is the same as a PL-RS for an SRS resource set with the second lowest index, where the second TRP corresponds to the second beam, i.e., the UE 111 transmits the PUSCH repetition toward the second TRP using the second beam.

Absence of the SRI Field:

For PUSCH repetition scheduled by a DCI that does not include an SRI field, the PL-RS for two TRPs can be set default. Since the higher layer parameter of PUSCH PC information element (IE) (e.g. PUSCH-PowerControl) may have one or two SRI PUSCH mapping lists (e.g. sri-PUSCH-Mapping ToAddModList), the following method is proposed to design TRP specific PL-RS for PUCSH transmission towards multi-TRPs.

In an embodiment of the invention, for multi-TRP based PUSCH repetition scheme scheduled by a DCI that does not include an SRI field, if the UE 111 detects two SRI PUSCH mapping lists (e.g. sri-PUSCH-MappingToAddModList), the first PL-RS resource index $q_d$ corresponding to the first TRP is provided by a higher layer parameter of a first PUSCH PL-RS index (e.g. PUSCH-PathlossReferenceRS-Id) mapped to a first SRI PUSCH PC index (e.g. SRI-PUSCH-PowerControlId) being equal to 0 in a higher layer parameter of the first SRI PUSCH mapping list (e.g. sri-PUSCH-Mapping ToAddModList), and the second PL-RS resource index $q_d$ corresponding to the second TRP is provided by a higher layer parameter of a second PUSCH PL-RS index (e.g. PUSCH-PathlossReferenceRS-Id) mapped to a second SRI PUSCH PC index (e.g. SRI-PUSCH-PowerControlId) being equal to 0 in a higher layer parameter of the second SRI PUSCH mapping list (e.g. sri-PUSCH-Mapping ToAddModList), where the first and second TRP correspond to the first and second beam respectively, i.e., the UE 111 transmits the PUSCH repetition toward the first TRP using the first beam and the second TRP using the second beam.

PUSCH Scheduled by DCI Format 0_0:

With configuration of spatial relation for PUCCH:

Since SRS based beam indication does not work in all cases and using UL based beam indication can decouple a pair of DL and UL beams, it is desirable to use the same beam through which PUSCH and PUCCH are transmitted if a spatial setting by a higher layer parameter of a PUCCH spatial relation (e.g. PUCCH-SpatialRelationInfo) for a PUCCH resource is configured. In this section, two embodiments of the disclosed method provide TRP specific PL-RS for PUSCH repetition scheduled by DCI format 0_0.

(1) The Spatial Setting for a PUCCH Resource with a Lowest Index:

In an embodiment of the invention, for multi-TRP based PUSCH repetition scheme scheduled by a DCI format 0_0, if the UE 111 is configured with the spatial relation in a higher layer parameter of PUCCH spatial relation (e.g. PUCCH-SpatialRelationInfo), the first PUSCH PL-RS resource index $q_d$ corresponding to the first TRP is the same as the spatial relation for the PUCCH resource with a lowest index, the second PUSCH PL-RS resource index $q_d$ corresponding to the second TRP is the same as the spatial relation for the PUCCH resource with a second lowest index, where the first and second TRP correspond to the first and second beam respectively, i.e., the UE 111 transmits the PUSCH repetition toward the first TRP using the first beam or the second TRP using the second beam.

(2) The Spatial Setting for a PUCCH Resource in the Latest Slot:

In an embodiment of the invention, for multi-TRP based PUSCH repetition scheme scheduled by a DCI format 0_0, if the UE 111 is configured with the spatial relation in a higher layer parameter of PUCCH spatial relation (e.g. PUCCH-SpatialRelationInfo), the first PUSCH PL-RS resource index $q_d$ corresponding to the first TRP is the same as a first entry of a spatial relation configured for PUCCH in the latest slot, the second PUSCH PL-RS resource index $q_d$ corresponding to the second TRP is the same as a second entry of the spatial relation configured for the PUCCH in the latest slot, where the first and second TRP correspond to the first and second beam respectively, i.e., the UE 111 transmits the PUSCH repetition toward the first TRP using the first beam and the second TRP using the second beam. In particular, for example, if only one entry of spatial relation is configured for the PUCCH in the latest slot, the second PUSCH PL-RS resource index $q_d$ corresponding to the second TRP is the same as the first entry of spatial relation configured for PUCCH in the second latest slot.

Without Configuration of Spatial Relation for PUCCH:

Since a second PUSCH PL-RS (i.e. PUSCH-PathlossReferenceRS or PUSCH-PathlossReferenceRS-r16) may be added, if the PUSCH transmission is scheduled by DCI format 0_0 and the UE 111 is not provided a spatial setting for a PUCCH transmission or if a higher layer parameter of SRI PUSCH PC (e.g. SRI-PUSCH-PowerControl) is not provided to the UE 111, the TRP specific default PL-RS for PUCSH transmission towards multi-TRP should be designed.

(1) One PUSCH PL-RS Parameter:

In an embodiment of the invention, for multi-TRP based PUSCH repetition scheme, if the PUSCH transmission is scheduled by DCI format 0_0 and the UE 111 is not provided a spatial setting for a PUCCH transmission or if the higher layer parameter of SRI PUSCH PC (e.g. SRI-PUSCH-PowerControl) is not provided to the UE 111, the first PUSCH PL-RS resource index $q_d$ corresponding to the first TRP is determined according to a higher layer parameter of a first PUSCH PL-RS index (e.g. PUSCH-PathlossReferenceRS-Id) with a value being equal to zero, and the second PUSCH PL-RS resource index $q_d$ corresponding to the second TRP is determined according to a higher layer parameter of a second PUSCH PL-RS index (e.g. PUSCH-PathlossReferenceRS-Id) with a value being equal to one, where the first and second TRP correspond to the first and second beam respectively, i.e., the UE 111 transmits the PUSCH repetition toward the first TRP using the first beam or the second TRP using the second beam.

(2) Two PUSCH PL-RS Parameter:

If a second higher layer parameter of PUSCH PL-RS (i.e. PUSCH-PathlossReferenceRS or PUSCH-PathlossReferenceRS-r16) is added, the first and second PUSCH PL-RS parameter correspond to the first and second TRP respectively.

In an embodiment of the invention, for multi-TRP based PUSCH repetition scheme, if the PUSCH transmission is scheduled by DCI format 0_0 and the UE 111 is not provided a spatial setting for a PUCCH transmission or if the higher layer parameter of SRI PUSCH PC (e.g. SRI-PUSCH-PowerControl) is not provided to the UE 111, the first PUSCH PL-RS resource index $q_d$ corresponding to the first TRP is determined according to a PUSCH PL-RS index (e.g. PUSCH-PathlossReferenceRS-Id) with a value being equal to zero in a higher layer parameter of a first PUSCH PL-RS (e.g. PUSCH-PathlossReferenceRS), and the second PUSCH PL-RS resource index $q_d$ corresponding to the second TRP is determined according to a PUSCH PL-RS index (e.g. PUSCH-PathlossReferenceRS-Id) with a value being equal to zero in a higher layer parameter of a second PUSCH PL-RS (e.g. PUSCH-PathlossReferenceRS), where the first and second TRP correspond to the first and second beam respectively, i.e., the UE 111 transmits the PUSCH repetition toward the first TRP using the first beam or the second TRP using the second beam. In the embodiment of the disclosure, the UE 111 uses two high layer parameters of PUSCH-PathlossReferenceRS. i.e. the first PUSCH PL-RS and second PUSCH PL-RS, to obtain the first PUSCH PL-RS resource index $q_d$ corresponding to the first TRP from the first PUSCH PL-RS and the second PUSCH PL-RS resource index $q_d$ corresponding to the second TRP from the second PUSCH PL-RS.

Update of Mapping Between SRI and PUSCH PL-RS:

For multi-TRP based PUCSH transmission, two SRI fields corresponding to two SRS resource sets and two PL-RSs corresponding to two TRPs are applied, where each SRI field indicates an SRI per TRP and each SRI maps to a PUSCH PL-RS. To reduce the signaling overhead, it is desirable that the UE 111 may receive a single MAC CE from a base station to update the mapping between the first SRI(s) in the first SRI field and the first PUSCH PL-RS for the first TRP, and the mapping between the second SRI(s) in the second SRI field and the second PUSCH PL-RS for the second TRP. Embodiments of the disclosed method are provided in the following to illustrate the MAC CE.

Single SRI Mapping to PUSCH PL-RS:

Since two TRPs are deployed and the power control is performed per TRP, in an embodiment of the invention, the mapping between the first SRI in the first SRI field and the first PUSCH PL-RS for the first TRP, and the mapping between the second SRI in the second SRI field and the second PUSCH PL-RS for the second TRP are updated by a single MAC CE. Moreover, to further reduce the overhead, only one SRI in the first SRI field is mapped to the first PUSCH PL-RS for the first TRP and only one SRI in the second SRI field is mapped to the second PUSCH PL-RS for the second TRP. Additionally, for the case of single-TRP PUSCH transmission, only one mapping between the SRI and the PUSCH PL-RS is enough. Hence, a reserved bit, referred to as bit R hereafter, can be used to indicate whether or not the second mapping between the second SRI and the second PUSCH PL-RS is updated. In an embodiment of the disclosed method, the UE 111 receives a medium access control (MAC) control element (CE), wherein the MAC CE comprises a field that indicates a first PUSCH PL-RS ID, a field that indicates a second PUSCH PL-RS ID, a field that indicates a first SRI PUSCH power control ID identified by a higher layer parameter of a first SRI PUSCH PC index, a field that indicates a second SRI PUSCH power control ID identified by a higher layer parameter of a second SRI PUSCH PC index, and reserved bits that indicates whether or not a mapping between a second SRI associated with the second SRI PUSCH power control ID and a second PUSCH PL-RS associated with the second PUSCH PL-RS ID is updated. The UE 111 determines whether or not the mapping between the second SRI and the second PUSCH PL-RS is updated based on the reserved bit. The first PUSCH PL-RS ID represents the first PUSCH PL-RS resource index, and the second PUSCH PL-RS ID represents the second PUSCH PL-RS resource index.

An example of the MAC CE is shown in FIG. 6. The MAC CE has a fixed size and has the following fields: a field Serving Cell ID that indicates an identity of a serving cell; a field BWP ID that indicates a UL bandwidth part (BWP) that contains activated PUSCH PL-RS; a field PUSCH Pathloss Reference RS ID0 that indicates a first PUSCH PL-RS ID, which is to be updated in a first SRI PUSCH power control mapping indicated by a field SRI ID0 in the same MAC CE; a field PUSCH Pathloss Reference RS ID1 that indicates a second PUSCH PL-RS ID, which is to be updated in a second SRI PUSCH power control mapping indicated by a field SRI ID1 indicated in the same MAC CE; the field SRI ID0 that indicates a first SRI PUSCH power control ID identified by a higher layer parameter of the first SRI PUSCH PC index (e.g. SRI-PUSCH-PowerControlId); and the field SRI ID1 that indicates a second SRI PUSCH power control ID identified by a higher layer parameter of the second SRI PUSCH PC index (e.g. SRI-PUSCH-PowerControlId). One out of two reserved bits R that is in front of the field PUSCH Pathloss Reference RS ID1 can be used to indicate whether or not the second mapping between the second SRI and the second PUSCH PL-RS is updated. In detail, if this reserved bit R is set to 0, the mapping between the second SRI and the second PUSCH PL-RS for the second TRP is not updated. If this reserved bit R is set to 1, the mapping between the second SRI and the second PUSCH PL-RS for the second TRP is updated.

Multiple SRI IDs of Single SRI Field Mapping to the Same PUSCH PL-RS:

For example, a UE according to its UE capability may only measure up to 4 PL-RSs. Because of the UE capability limitations, if the sequential transmission of MAC CE to update the mapping regarding more than four PL-RSs, the UE 111 cannot measure the indicated PL-RSs. Therefore, provided that the maximum number of SRI IDs of a single SRI field is 16, it is desirable that multiple SRI IDs in the single SRI field can be mapped to the same PUSCH PL-RS.

In an embodiment of the invention, the mapping between the first SRI(s) in the first SRI field and the first PUSCH PL-RS for the first TRP, and the mapping between the second SRIs in the second SRI field and the second PUSCH PL-RS for the second TRP are updated by a single MAC CE. Moreover, multiple SRIs in the first SRI field can be mapped to the first PUSCH PL-RS for the first TRP and multiple SRIs in the second SRI field can be mapped to the second PUSCH PL-RS for the second TRP. Additionally, for the case of single-TRP PUSCH transmission, only one mapping between the SRI and the PUSCH PL-RS is enough. Hence, a reserved bit, such as the bit R, can be used to indicate whether or not the second mapping between the second SRI(s) and the second PUSCH PL-RS is updated.

An example of the MAC CE is shown in the FIG. 7. The MAC CE has a variable size and has the following fields: the field Serving Cell ID that indicates the identity of the Serving Cell; the field BWP ID that indicates a UL BWP that contains activated PUSCH PL-RS(s); the field PUSCH Pathloss Reference RS ID0 that indicates the first PUSCH PL-RS ID, which is to be updated in the first SRI PUSCH power control mapping indicated by SRI ID0_x field(s) in the same MAC CE, where x is a variable; the field PUSCH Pathloss Reference RS ID1 that indicates the second PUSCH PL-RS ID, which is to be updated in the second SRI PUSCH power control mapping indicated by SRI ID1_y field(s) in the same MAC CE, where x is a variable; the field SRI ID0_x that indicates the first SRI PUSCH power control ID identified by a higher layer parameter of the first SRI PUSCH PC index (e.g. SRI-PUSCH-PowerControlId), the field SRI ID1_y that indicates the second SRI PUSCH power control ID identified by a higher layer parameter of the second SRI PUSCH PC index (e.g. SRI-PUSCH-PowerControlId). In the example as shown in FIG. 7, a SRI ID0_x field may represent SRI ID0_0, SRI ID0_1, . . . . SRI ID0_N-6, and SRI ID0_N-5, where N is a positive integer, and an SRI ID1_y field may represent SRI ID1_0, SRI ID1_1, . . . . SRI ID1_M-4, and SRI ID1_M-3, where M is a positive integer.

The field C in front of the corresponding field PUSCH Pathloss Reference RS ID indicates the presence of an additional SRI ID in the last octet of these SRI ID fields associated with a PUSCH PL-RS ID. If this field is set to 1, two SRI ID(s) are present in the last octet. Otherwise, only one SRI ID (i.e. the first SRI ID) is present in the last octet. When receiving the MAC CE with the field C that indicates the presence of an additional SRI ID in the last octet of SRI ID fields associated with the first PUSCH PL-RS ID, the UE 111 determines the presence of an additional SRI ID in the last octet of SRI ID fields associated with the first PUSCH PL-RS ID based on the field C. When this field C is set to 1, the UE determines that two SRI ID(s) are present in the last octet. When this field C is set to 0, the UE 111 determines that only one SRI ID (i.e. the first SRI ID) is present in the last octet. The UE 111 may receive a MAC CE. The MAC CE has a first indicating field C that indicates the presence of an additional SRI ID in the last octet of SRI ID fields associated with a first PUSCH PL-RS ID and a second indicating field C that indicates the presence of an additional SRI ID in the last octet of SRI ID fields associated with a second PUSCH PL-RS ID. The first PUSCH PL-RS ID represents the first PUSCH PL-RS resource index, and the second PUSCH PL-RS ID represents the second PUSCH PL-RS resource index. The UE 111 determines the presence of an additional SRI ID in the last octet of SRI ID fields associated with the first PUSCH PL-RS ID based on the first indicating field. The UE 111 determines the presence of an additional SRI ID in the last octet of SRI ID fields associated with the second PUSCH PL-RS ID based on the second indicating field. When this field C is set to 1, the UE determines that two SRI ID(s) are present in the last octet. When this field C is set to 0), the UE 111 determines that only one SRI ID (i.e. the first SRI ID) is present in the last octet.

For the indication of the presence of the second mapping, two embodiments of the disclosed method are provided.

In one embodiment of the disclosure, the reserved bit in front of the field PUSCH Pathloss Reference RS ID1 can be used to indicate whether or not the second mapping between the second SRI and the second PUSCH PL-RS is updated. In detail, if this reserved bit is set to 0, the mapping between the second SRI(s) in the second SRI field and the second PUSCH PL-RS for the second TRP is not updated. If this reserved bit is set to 1, the mapping between the second SRI(s) in the second SRI field and the second PUSCH PL-RS for the second TRP is updated. In other words, the UE 111 receives the MAC CE. The MAC CE comprises a field that indicates a first PUSCH PL-RS ID, a field that indicates a second PUSCH PL-RS ID, a first group of SRI ID fields SRI ID1_x, a second group of SRI ID fields SRI ID1_y, and a reserved bit that indicates whether or not a second SRI PUSCH power control mapping between the second group of SRI ID fields SRI ID1_y associated with the second SRI PUSCH power control ID and a second PUSCH PL-RS associated with the second PUSCH PL-RS ID is updated. The first PUSCH PL-RS ID represents the first PUSCH PL-RS resource index, and the second PUSCH PL-RS ID represents the second PUSCH PL-RS resource index. The UE 111 determines whether or not the second SRI PUSCH power control mapping is updated based on the reserved bit.

In another embodiment of the disclosure, the reserved bit in front of the field PUSCH Pathloss Reference RS ID0 can be used to indicate the presence of the field PUSCH Pathloss Reference RS ID1 and the field SRI ID1_y, i.e. presence of the second SRI PUSCH power control mapping between the field PUSCH Pathloss Reference RS ID1 and the field SRI ID1_y. In detail, if this field is set to 1, these fields are present; otherwise, these fields are not present. In other words, the UE 111 receives the MAC CE. The MAC CE comprises a field that indicates a first PUSCH PL-RS ID, a field that indicates a second PUSCH PL-RS ID, a first group of SRI ID fields SRI ID1_x, a second group of SRI ID fields SRI ID1_y, and a reserved bit that indicates whether or not a second SRI PUSCH power control mapping between the second group of SRI ID fields SRI ID1_y associated with the second SRI PUSCH power control ID and a second PUSCH PL-RS associated with the second PUSCH PL-RS ID is present. The first PUSCH PL-RS ID represents the first PUSCH PL-RS resource index, and the second PUSCH PL-RS ID represents the second PUSCH PL-RS resource index. The UE 111 determines whether or not the second SRI PUSCH power control mapping is present based on the reserved bit.

Open Loop Power Control:

In NR standard Rel-16, when URLLC transmissions collide with eMBB traffic from other UEs, power boosting URLLC transmissions by modifying P0 is defined to control the open loop power in case of collision. Embodiments of the disclosed method that control power boosting of the two TRPs separately for multi-TRP based PUSCH repetitions are provided in the following. As is shown in FIG. 1. URLLC traffic from the UE 111 collides with eMBB traffic from the UE 112 only at the first TRP 100_1. Hence, a power boost is only conducted for the UE 111 at the first TRP 100_1.

Determination of P0 Value:

Presence of SRI Field:

(1) One P0 Value Set List for Open Loop (OL) Power Control (PC):

Since two SRI fields corresponding to two TRPs are included in DCI format 0_1 or DCI format 0_2, a DCI signal of the DCI format 0_1 or 0_2 may comprise one or two open-loop power control parameter set indication fields, and two P0 values for open loop (OL) power control (PC) corresponding to two TRPs can be provided in the same higher layer parameter of a P0 value list.

Figures 8, 9, 10:
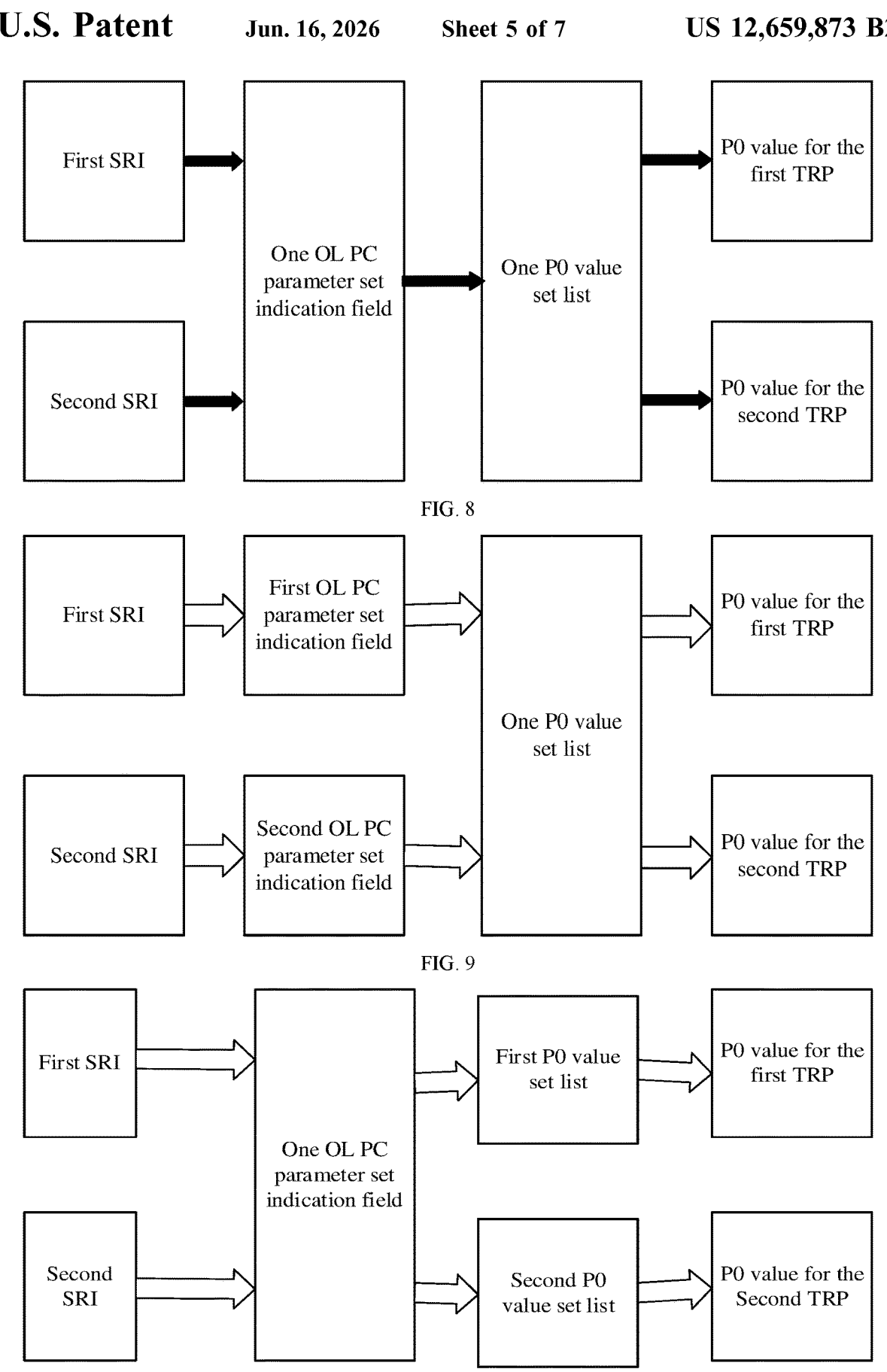
FIG. 8 is a schematic view showing an example of determination of P0 values for two TRPs using one open-loop (OL) power control (PC) parameter set indication field.
FIG. 9 is a schematic view showing an example of determination of P0 values for two TRPs using two OL PC parameter set indication fields.
FIG. 10 is a schematic view showing an example of determination of P0 values for two TRPs using one OL PC parameter set indication field and two P0 value set lists with two SRI fields.

A. One OL PC Parameter Set Indication Field:

As is shown in FIG. 8, the two P0 values for the first TRP and the second TRP can be determined using one open-loop (OL) power control (PC) parameter set indication field.

In an embodiment of the invention, for multi-TRP based PUSCH repetition scheme, if a DCI format of a DCI signal from a base station to the UE 111 includes two SRI fields and the DCI format includes only one open-loop power control parameter set indication field, the P0 values for the two TRPs can be indicated by the same OL PC parameter set indication field. In detail, if the DCI format includes one open-loop power control parameter set indication field and a value of the open-loop power control parameter set indication field is '1', the P0 value $P_{O\_UE\_PUSCH,b,f,c}(j)$ corresponding to the first TRP is determined according to a first value in a higher layer parameter of a P0 value set (e.g. P0-PUSCH-Set-r16) of the P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in the first SRI field. The P0 value $P_{O\_UE\_PUSCH,b,f,c}(j)$ corresponding to the second TRP is determined according to a first value in the higher layer parameter of the P0 value set (e.g. P0-PUSCH-Set-r16) of the P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in the second SRI field. Regarding the first and second TRP, the first and second TRP correspond to the first and second beam respectively, i.e., the UE 111 transmits the PUSCH repetition toward the first TRP using the first beam and the second TRP using the second beam. In the embodiment, the first TRP and the second TRP share the same P0 value set list. The first value for the determination of the P0 value for the first TRP may be different from the first value for the determination of the P0 value for the second TRP because the parameter p0-List-r16 has two p0-PUSCHs (i.e., p0 value). Although the first values in the P0 value set for both TRP's are called first value, the two first values may be two different values under two different parameters P0-PUSCH-Set-r16. Here it is the SRI value in the first SRI field that determines the p0-PUSCH-SetId-r16 of TRP1, and then the P0-PUSCH-Set-r16 of TRP1. The first p0-PUSCH in p0-List-r16 under this P0-PUSCH-Set-r16 of TRP1 is referred to as the first P0 value and is obtained as the P0 value used for TRP1. Similarly, an SRI value in the second SRI field determines the p0-PUSCH-SetId-r16 of TRP2, and then determines the P0-PUSCH-Set-r16 of TRP2. The first p0-PUSCH in p0-List-r16 under this P0-PUSCH-Set-r16 of TRP2 is referred to as the first P0 value and is obtained as the P0 value used for TRP2. The P0 values are determined by the SRI values of the first SRI field and second SRI field.

As is shown in Table 4, p0-PUSCH-SetList-r16 is an example of the P0 value set list, and P0-PUSCH-Set-r16 is an example of the P0 value set.

TABLE 4

| Higher layer parameter of P0 value for OL PC |
|---|

```
PUSCH-PowerControl-v1610 ::=        SEQUENCE {
    pathlossReferenceRSToAddModList2-r16        SEQUENCE (SIZE (1..maxNrofPUSCH-
PathlossReferenceRSsDiff-r16)) OF PUSCH-PathlossReferenceRS-r16
    OPTIONAL, -- Need N
    pathlossReferenceRSToReleaseList2-r16        SEQUENCE (SIZE (1..maxNrofPUSCH-
PathlossReferenceRSsDiff-r16)) OF PUSCH-PathlossReferenceRS-Id-v1610
    OPTIONAL, -- Need N
    p0-PUSCH-SetList-r16                    SEQUENCE (SIZE (1..maxNrofSRI-PUSCH-
Mappings)) OF P0-PUSCH-Set-r16      OPTIONAL, -- Need R
        olpc-ParameterSet                  SEQUENCE {
            olpc-ParameterSetDCI-0-1-r16                                    INTEGER (1..2)
    OPTIONAL, -- Need R
            olpc-ParameterSetDCI-0-2-r16                                    INTEGER (1..2)
    OPTIONAL -- Need R
    }
    OPTIONAL, -- Need M
    . . .
}
```

TABLE 4-continued

| Higher layer parameter of P0 value for OL PC |
| --- |

```
P0-PUSCH-Set-r16 ::=          SEQUENCE {
   p0-PUSCH-SetId-r16              P0-PUSCH-SetId-r16,
   p0-List-r16                     SEQUENCE (SIZE (1..maxNrofP0-PUSCH-Set-r16))
OF P0-PUSCH-r16      OPTIONAL, -- Need R
   . . .
}
P0-PUSCH-SetId-r16 ::=        INTEGER (0..maxNrofSRI-PUSCH-Mappings-1)
P0-PUSCH-r16 ::=             INTEGER (−16..15)
```

B. Two OL PC Parameter Set Indication Field:

As is shown in FIG. 9, the two P0 values for the first TRP and the second TRP can be determined using two OL PC parameter set indication fields.

In an embodiment of the invention, for multi-TRP based PUSCH repetition scheme, if the DCI format includes two SRI fields and the DCI format includes two open-loop power control parameter set indication fields, the P0 values for the two TRPs can be indicated by the two OL PC parameter set indication fields respectively. In detail, if a DCI format of a DCI signal sent from the base station to the UE 111 includes two open-loop power control parameter set indication fields, referred to a first and a second open-loop power control parameter set indication field, and a value of the first open-loop power control parameter set indication field is '1', the P0 value $P_{O\_UE\_PUSCH,b,f,c}(j)$ corresponding to the first TRP is determined according to a first value in a higher layer parameter of a P0 value set (e.g. P0-PUSCH-Set-r16) of a P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in the first SRI field. If the DCI format includes two open-loop power control parameter set indication fields and a value of the second open-loop power control parameter set indication field is '1', the P0 value $P_{O\_UE\_PUSCH,b,f,c}(j)$ corresponding to the second TRP is determined according to a first value in a higher layer parameter of the P0 value set (e.g. P0-PUSCH-Set-r16) of the P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in the second SRI field. Regarding the first and second TRP, the first and second TRP correspond to the first and second beam respectively, i.e., the UE 111 transmits the PUSCH repetition toward the first TRP using the first beam or the second TRP using the second beam.

C. Two P0 Values in the Higher Layer Parameter of the P0 Value Set:

To reduce modifications to the specification, using the two P0 values in a higher layer parameter of the P0 value set (e.g. P0-PUSCH-Set-r16) is desirable. In an embodiment of the invention, for multi-TRP based PUSCH repetition scheme, if the DCI format includes two SRI fields, two P0 values (i.e. two p0-PUSCH in the higher layer parameter of p0-List) can be configured in the higher layer parameter of the P0 value set (e.g. P0-PUSCH-Set-r16) regardless the value of the higher layer parameter of OL PC parameter (e.g. olpc-ParameterSetDCI-0-1/olpc-ParameterSetDCI-0-2) and the P0 values for the two TRPs can be determined by the two P0 values in the higher layer parameter of the P0 value set (e.g. P0-PUSCH-Sct-r16) respectively, where the higher layer parameter of the P0 value set (e.g. P0-PUSCH-Set-r16) can be determined by a SRI of a dedicated SRI field, e.g. SRI in the first SRI field. A first value in a higher layer parameter of the P0 value set (e.g. P0-PUSCH-Set-r16) may be a first p0-PUSCH in the higher layer parameter of p0-List, and a second value in the higher layer parameter of the P0 value set (e.g. P0-PUSCH-Set-r16) may be a second p0-PUSCH in the higher layer parameter of p0-List. In detail, if the DCI format of a DCI signal received by the UE includes an open-loop power control parameter set indication field and a value of the open-loop power control parameter set indication field is '1', the P0 value $P_{O\_UE\_PUSCH,b,f,c}(j)$ corresponding to the first TRP is determined according to a first value in a higher layer parameter of a P0 value set (e.g. P0-PUSCH-Set-r16) of the P0 value set list (e.g. p0-PUSCH-SetList-r16), where the P0 value set (e.g. P0-PUSCH-Set-r16) includes a P0 value set index (e.g. p0-PUSCH-SetId-r16) mapped to a SRI value in a dedicated SRI field, e.g. the first SRI field. If the DCI format includes an open-loop power control parameter set indication fields and a value of the open-loop power control parameter set indication field is 'I', the P0 value $P_{O\_UE\_PUSCH,b,f,c}(j)$ corresponding to the second TRP is determined according to a second value in the higher layer parameter of the P0 value set (e.g. P0-PUSCH-Set-r16) of the P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in a dedicated SRI field, such as the first SRI field. Regarding the first and second TRP, the first and second TRP correspond to the first and second beam respectively, i.e., the UE 111 transmits the PUSCH repetition toward the first TRP using the first beam or the second TRP using the second beam.

(2) Two P0 Value Set Lists for OL PC:

To support TRP specific OL PC, the DCI signal received by the UE may comprise one or two open-loop power control parameter set indication field(s) in the DCI. Since two SRI fields corresponding to two TRPs are included in DCI formats 0_1/0_2, if two open-loop power control parameter set indication fields are included in the DCI signal, each of the OL PC parameter set indication fields corresponds to a separate SRI field. Additionally, to enable the TRP specific OL PC flexibly, two higher layer parameters of the P0 value set list (e.g. p0-PUSCH-SetList-r16) for OL PC is desirable.

A. One OL PC parameter set indication field:

As is shown in FIG. 10, the two P0 values for the first TRP and the second TRP can be determined using one OL PC parameter set indication field and two P0 value set lists.

In an embodiment of the invention, for multi-TRP based PUSCH repetition scheme, if the DCI format of a DCI signal received by the UE includes two SRI fields and the DCI format includes only one open-loop power control parameter set indication field, the P0 values for the two TRPs can be indicated by the same OL PC parameter set indication field and determined according to two P0 value lists (e.g. p0-PUSCH-SetList-r16) respectively. In detail, if the DCI format of a DCI signal received by the UE includes one open-loop power control parameter set indication field and a value of the open-loop power control parameter set indication field is '1', the P0 value $P_{O\_UE\_PUSCH,b,f,c}(j)$ corresponding to the first TRP is determined according to a first value in a higher layer parameter of a P0 value set (e.g. P0-PUSCH-Set-r16) of a first P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in a first SRI field. The P0 value $P_{O\_UE\_PUSCH,b,f,c}(j)$ corresponding to the second TRP is determined according to a first value in a higher layer parameter of a P0 value set (e.g. P0-PUSCH-Set-r16) of a second P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in the second SRI field. Regarding the first and second TRP, the first and second TRP correspond to the first and second beam respectively, i.e., the UE 111 transmits the PUSCH repetition toward the first TRP using the first beam or the second TRP using the second beam. P0-PUSCH-Set-r16 of TRP1 is obtained from a chain of mappings originated from an SRI value in a first SRI field which is mapped to a p0-PUSCH-SetId-r16 which is mapped to a P0-PUSCH-Set-r16 in the first P0 value set list. Similarly. P0-PUSCH-Set-r16 of TRP2 is obtained from a chain of mappings originated from an SRI value in a second SRI field which is mapped to a p0-PUSCH-SetId-r16 which is mapped to a P0-PUSCH-Set-r16 in the second P0 value set list. The parameters P0-PUSCH-Set-r16 for the two TRPs come from a first P0 value set list and a second P0 value set list respectively, and may have so different values.

B. Two OL PC Parameter Set Indication Field:

As is shown in FIG. 11, the two P0 values for the first TRP and the second TRP can be determined using two OL PC parameter set indication fields and two P0 value set lists.

In an embodiment of the invention, for multi-TRP based PUSCH repetition scheme, if the DCI format (e.g. DCI formats 0_1/0_2) includes two SRI fields and two open-loop power control parameter set indication fields, a second higher layer parameter of P0 value set list (e.g. p0-PUSCH-SetList-r16) for OL PC is added and the P0 values for the two TRPs can be indicated by the two OL PC parameter set indication fields respectively. In detail, if the DCI format of a DCI signal received by the UE includes two open-loop power control parameter set indication fields and a value of the first open-loop power control parameter set indication field is '1', the P0 value $P_{O\_UE\_PUSCH,b,f,c}(j)$ corresponding to the first TRP is determined according to a first value in a higher layer parameter of a P0 value set (e.g. P0-PUSCH-Set-r16) of a first P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in a first SRI field. If the DCI format includes two open-loop power control parameter set indication fields and a value of the second open-loop power control parameter set indication field is '1', the P0 value $P_{O\_UE\_PUSCH,b,f,c}(j)$ corresponding to the second TRP is determined according to a first value in a higher layer parameter of a P0 value set (e.g. P0-PUSCH-Sct-r16) of a second P0 value set list (e.g. p0-PUSCH-SetList-r16), where the P0 value set (e.g. P0-PUSCH-Set-r16) includes a P0 value set index (e.g. p0-PUSCH-SetId-r16) mapped to an SRI value in a second SRI field. Regarding the first and second TRP, the first and second TRP correspond to the first and second beam respectively, i.e., the UE 111 transmits the PUSCH repetition toward the first TRP using the first beam or the second TRP using the second beam.

Absence of SRI Field:

(1) None of the P0 Value Set:

If the UE 111 has no higher layer parameter of the P0 value set (e.g. P0-PUSCH-Set-r16), it is preferable to determine the P0 value using a higher layer parameter of a P0 alpha value set (e.g. P0-PUSCH-AlphaSet). In an embodiment of the invention, for multi-TRP based PUSCH repetition scheme, if the DCI format (e.g. DCI formats 0_1/0_2) of a DCI signal received by the UE does not include an SRI field, and the UE 111 receives no higher layer parameter of the P0 value set (e.g. P0-PUSCH-Set-r16) or an open-loop power control parameter set indication field, the two P0 values for the first TRP and the second TRP are determined by the higher layer parameter of the P0 alpha value set (e.g. P0-PUSCH-AlphaSet). In detail, the P0 value $P_{O\_UE\_PUSCH,b,f,c}(j)$ corresponding to the first TRP is determined according to a value of the higher layer parameter of the first P0 alpha value set (e.g. P0-PUSCH-AlphaSet) of a P0 alpha value set list (e.g. p0-AlphaSets) and the P0 value $P_{O\_UE\_PUSCH,b,f,c}(j)$ corresponding to the second TRP is determined according to a value of the higher layer parameter of the second P0 alpha value set (e.g. P0-PUSCH-AlphaSet) of the P0 alpha value set list (e.g. p0-AlphaSets). Regarding the first and second TRP, the first and second TRP correspond to the first and second beam respectively, i.e., the UE 111 transmits the PUSCH repetition toward the first TRP using the first beam or the second TRP using the second beam.

(2) One P0 Value Set List:

If the UE receives one higher layer parameter of the P0 value set list (e.g. p0-PUSCH-SetList-r16) and the value of OL PC parameter set indication field is not zero, it preferable to determine the P0 value using the P0 value set of the P0 value set list; otherwise, the P0 value can be determined using the P0 alpha value set.

A. One OL PC Parameter Set Indication Field:

If the UE receives only one OL PC parameter set indication field, the two P0 values for the first TRP and the second TRP are indicated by the same OL PC parameter set indication field. In an embodiment of the invention, for multi-TRP based PUSCH repetition scheme, if the DCI format (e.g. DCI formats 0_1/0_2) of a DCI signal received by the UE does not include an SRI field and the UE receives configurations of the P0 value set (e.g. P0-PUSCH-Set-r16) and only one OL PC parameter set indication field, the two P0 values for the first TRP and the second TRP are determined by the higher layer parameter of a P0 alpha value set (e.g. P0-PUSCH-AlphaSet) or the higher layer parameter of the P0 value set (e.g. P0-PUSCH-Set-r16) according to indication in the OL PC parameter set indication field.

In detail, if the value of open-loop power control parameter set indication field is '0' or '00', the P0 value $P_{O\_UE\_PUSCH,b,f,c}(j)$ corresponding to the first TRP is determined according to the value of the higher layer parameter of the first P0 alpha value set (e.g. P0-PUSCH-AlphaSet) of the P0 alpha value set list (e.g. p0-AlphaSets) and the P0 value $P_{O\_UE\_PUSCH,b,f,c}(j)$ corresponding to the second TRP is determined according to the value of the higher layer parameter of the second P0 alpha value set (e.g. P0-PUSCH-AlphaSet) of the P0 alpha value set list (e.g. p0-AlphaSets).

If the value of open-loop power control parameter set indication field is '1' or '01', the P0 value $P_{O\_UE\_PUSCH,b,f,c}(j)$ corresponding to the first TRP is determined according to the first value in the higher layer parameter of the P0 value set (e.g. P0-PUSCH-Set-r16) with the lowest P0 value set index (e.g. p0-PUSCH-SetId-r16) in the P0 value set list and the P0 value $P_{O\_UE\_PUSCH,b,f,c}(j)$ corresponding to the second TRP is determined according to the first value in the higher layer parameter of the P0 value set (e.g. P0-PUSCH-Set-r16) with the second lowest P0 value set index (e.g. p0-PUSCH-SetId-r16) in the P0 value set list.

If the value of open-loop power control parameter set indication field is '10', the P0 value $P_{O\_UE\_PUSCH,b,f,c}(j)$ corresponding to the first TRP is determined according to the second value in the higher layer parameter of the P0 value set (e.g. P0-PUSCH-Set-r16) with the lowest P0 value set index (e.g. p0-PUSCH-SetId-r16) in the P0 value set list and the P0 value $P_{O\_UE\_PUSCH,b,f,c}(j)$ corresponding to the second TRP is determined according to the second value in the higher layer parameter of the P0 value set (e.g. P0-PUSCH-Set-r16) with the second lowest P0 value set index (e.g. p0-PUSCH-SetId-r16) in the P0 value set list.

Regarding the first and second TRP, the first and second TRP correspond to the first and second beam respectively, i.e., the UE 111 transmits the PUSCH repetition toward first TRP using the first beam or the second TRP using the second beam.

B. Two OL PC Parameter Set Indication Fields:

As is shown in FIG. 12, the two P0 values for the first TRP and the second TRP can be determined using two OL PC parameter set indication fields and one P0 value set list with no SRI field.

If the UE receives two OL PC parameter set indication fields, the two P0 values for the first TRP and the second TRP are indicated by the two OL PC parameter set indication fields respectively.

In an embodiment of the invention, for multi-TRP based PUSCH repetition scheme, if the DCI format (e.g. DCI formats 0_1/0_2) of a DCI signal received by the UE does not include an SRI field and the UE receives configurations of the P0 value set (e.g. P0-PUSCH-Set-r16) and two OL PC parameter set indication fields, the two P0 values for the first TRP and the second TRP are determined by the higher layer parameter of the P0 value set (e.g. P0-PUSCH-Set-r16) according to indication in the corresponding OL PC parameter set indication field.

In detail, if the value of the first open-loop power control parameter set indication field is '0' or "00", the P0 value $P_{O\_UE\_PUSCH,b,f,c}(j)$ corresponding to the first TRP is determined according to the value of the higher layer parameter of a first P0 alpha value set (e.g. P0-PUSCH-AlphaSet) of the P0 alpha value set list (e.g. p0-AlphaSets). If the value of the second open-loop power control parameter set indication field is '0' or '00', the P0 value $P_{O\_UE\_PUSCH,b,f,c}(j)$ corresponding to the second TRP is determined according to the value of the higher layer parameter of a second P0 alpha value set (e.g. P0-PUSCH-AlphaSet) of the P0 alpha value set list (e.g. p0-AlphaSets).

If the value of the first open-loop power control parameter set indication field is '1' or '01', the P0 value $P_{O\_UE\_PUSCH,b,f,c}(j)$ corresponding to the first TRP is determined according to the first value in the higher layer parameter of the P0 value set (e.g. P0-PUSCH-Set-r16) with the lowest P0 value set index (e.g. p0-PUSCH-SetId-r16) in the P0 value set list. If the value of the second open-loop power control parameter set indication field is '1' or '01', the P0 value $P_{O\_UE\_PUSCH,b,f,c}(j)$ corresponding to the second TRP is determined according to the first value in the higher layer parameter of the P0 value set (e.g. P0-PUSCH-Set-r16) with the second lowest P0 value set index (e.g. p0-PUSCH-SetId-r16) in the P0 value set list.

If the value of the first open-loop power control parameter set indication field is '10', the P0 value $P_{O\_UE\_PUSCH,b,f,c}(j)$ corresponding to the first TRP is determined according to the second value in the higher layer parameter of the P0 value set (e.g. P0-PUSCH-Set-r16) with the lowest P0 value set index (e.g. p0-PUSCH-SetId-r16) in the P0 value set list. If the value of the second open-loop power control parameter set indication field is '10', the P0 value $P_{O\_UE\_PUSCH,b,f,c}(j)$ corresponding to the second TRP is determined according to the second value in the higher layer parameter of the P0 value set (e.g. P0-PUSCH-Set-r16) with the second lowest P0 value set index (e.g. p0-PUSCH-SetId-r16) in the P0 value set list.

Regarding the first and second TRP, the first and second TRP correspond to the first and second beam respectively, i.e., the UE 111 transmits the PUSCH repetition toward the first TRP using the first beam or the second TRP using the second beam.

(3) Two P0 Value Set List:

If the UE receives two higher layer parameters of the P0 value set list (e.g. p0-PUSCH-SetList-r16) and the value of OL PC parameter set indication field is not zero, it preferable to determine the P0 value using the P0 value set of the corresponding P0 value set list; otherwise, P0 value can be determined by the P0 alpha value set.

A. One OL PC Parameter Set Indication Field:

If the UE receives one OL PC parameter set indication field, the two P0 values for the first TRP and the second TRP are indicated by the same OL PC parameter set indication field. In an embodiment of the invention, for multi-TRP based PUSCH repetition scheme, if the DCI format (e.g. DCI formats 0_1/0_2) of a DCI signal received by the UE does not include an SRI field and the UE receives two higher layer parameters of the P0 value set list (e.g. p0-PUSCH-SetList-r16) and only one OL PC parameter set indication field, the two P0 values for the first TRP and the second TRP are determined by the higher layer parameter of a P0 alpha value set (e.g. P0-PUSCH-AlphaSet) or the higher layer parameter of the P0 value set (e.g. P0-PUSCH-Set-r16) of the corresponding P0 value set list according to the indication of the same OL PC parameter set indication field.

In detail, if the value of open-loop power control parameter set indication field is '0' or '00', the P0 value $P_{O\_UE\_PUSCH,b,f,c}(j)$ corresponding to the first TRP is determined according to a value of a higher layer parameter of a first P0 alpha value set (e.g. P0-PUSCH-AlphaSet) of a P0 alpha value set list (e.g. p0-AlphaSets) and the P0 value $P_{O\_UE\_PUSCH,b,f,c}(j)$ corresponding to the second TRP is determined according to a value of a higher layer parameter of a second P0 alpha value set (e.g. P0-PUSCH-AlphaSet) of the P0 alpha value set list (e.g. p0-AlphaSets).

If the value of open-loop power control parameter set indication field is '1' or '01', the P0 value $P_{O\_UE\_PUSCH,b,f,c}(j)$ corresponding to the first TRP is determined according to a first value in the higher layer parameter of the P0 value set (e.g. P0-PUSCH-Set-r16) with the lowest P0 value set index (e.g. p0-PUSCH-SetId-r16) in a first P0 value set list (e.g. p0-PUSCH-SetList-r16) and the P0 value $P_{O\_UE\_PUSCH,b,f,c}(j)$ corresponding to the second TRP is determined according to the first value in the higher layer parameter of the P0 value set (e.g. P0-PUSCH-Set-r16) with the lowest P0 value set index (e.g. p0-PUSCH-SetId-r16) in a second P0 value set list (e.g. p0-PUSCH-SetList-r16).

If the value of open-loop power control parameter set indication field is 10', the P0 value $P_{O\_UE\_PUSCH,b,f,c}(j)$ corresponding to the first TRP is determined according to a second value in the higher layer parameter of the P0 value set (e.g. P0-PUSCH-Set-r16) with the lowest P0 value set index (e.g. p0-PUSCH-SetId-r16) in the first P0 value set list (e.g. p0-PUSCH-SetList-r16) and the P0 value $P_{O\_UE\_PUSCH,b,f,c}(j)$ corresponding to the second TRP is determined according to the second value in the higher layer parameter of the P0 value set (e.g. P0-PUSCH-Set-r16) with the lowest P0 value set index (e.g. p0-PUSCH-SetId-r16) in the second P0 value set list (e.g. p0-PUSCH-SetList-r16).

Regarding the first and second TRP, the first and second TRP correspond to the first and second beam respectively, i.e., the UE 111 transmits the PUSCH repetition toward the first TRP using the first beam or the second TRP using the second beam.

B. Two OL PC Parameter Set Indication Fields:

As is shown in FIG. 13, the two P0 values for the first TRP and the second TRP can be determined using two OL PC parameter set indication fields and two P0 value set lists with no SRI field in DCI.

If the UE receives two OL PC parameter set indication fields, the two P0 values for the first TRP and the second TRP are indicated by the two OL PC parameter set indication fields respectively.

In an embodiment of the invention, for multi-TRP based PUSCH repetition scheme, if the DCI format (e.g. DCI formats 0_1/0_2) of a DCI signal received by the UE does not include an SRI field and two higher layer parameters of the P0 value set lists (e.g. p0-PUSCH-SetList-r16), and the UE receives two OL PC parameter set indication fields, the P0 value for the first TRP are determined using a higher layer parameter of a P0 alpha value set (e.g. P0-PUSCH-AlphaSet) or a higher layer parameter of the P0 value set (e.g. P0-PUSCH-Set-r16) of a corresponding P0 value set list associated with the first TRP according to indication in a corresponding OL PC parameter set indication field associated with the first TRP, and the P0 values for the second TRP are determined using a higher layer parameter of a P0 alpha value set (e.g. P0-PUSCH-AlphaSet) or a higher layer parameter of the P0 value set (e.g. P0-PUSCH-Set-r16) of a corresponding P0 value set list associated with the second TRP according to indication in a corresponding OL PC parameter set indication field associated with the second TRP.

In detail, if the value of a first open-loop power control parameter set indication field is '0' or '0.00', the P0 value $P_{O\_UE\_PUSCH,b,f,c}(j)$ corresponding to the first TRP is determined according to a value of a higher layer parameter of a first P0 alpha value set (e.g. P0-PUSCH-AlphaSet) of a P0 alpha value set list (e.g. p0-AlphaSets). If the value of a second open-loop power control parameter set indication field is '0' or '00', the P0 value $P_{O\_UE\_PUSCH,b,f,c}(j)$ corresponding to the second TRP is determined according to a value of a higher layer parameter of a second P0 alpha value set (e.g. P0-PUSCH-AlphaSet) of the P0 alpha value set list (e.g. p0-AlphaSets).

If the value of the first open-loop power control parameter set indication field is '1' or '01', the P0 value $P_{O\_UE\_PUSCH,b,f,c}(j)$ corresponding to the first TRP is determined according to a first value in a higher layer parameter of a P0 value set (e.g. P0-PUSCH-Set-r16) with the lowest P0 value set index (e.g. p0-PUSCH-SetId-r16) in a first P0 value set list (e.g. p0-PUSCH-SetList-r16) associated with the first TRP. If the value of the second open-loop power control parameter set indication field is '1' or '01', the P0 value $P_{O\_UE\_PUSCH,b,f,c}(j)$ corresponding to the second TRP is determined according to a first value in a higher layer parameter of a P0 value set (e.g. P0-PUSCH-Set-r16) with the lowest P0 value set index (e.g. p0-PUSCH-SetId-r16) in a second P0 value set list (e.g. p0-PUSCH-SetList-r16) associated with the second TRP.

If the value of the first open-loop power control parameter set indication field is '10', the P0 value $P_{O\_UE\_PUSCH,b,f,c}(j)$ corresponding to the first TRP is determined according to a second value in the higher layer parameter of the P0 value set (e.g. P0-PUSCH-Set-r16) with the lowest P0 value set index (e.g. p0-PUSCH-SetId-r16) in the first P0 value set list (e.g. p0-PUSCH-SetList-r16) associated with the first TRP. If the value of the second open-loop power control parameter set indication field is '10', the P0 value $P_{O\_UE\_PUSCH,b,f,c}(j)$ corresponding to the second TRP is determined according to a second value in the higher layer parameter of the P0 value set (e.g. P0-PUSCH-Set-r16) with the lowest P0 value set index (e.g. p0-PUSCH-SetId-r16) in the second P0 value set list (e.g. p0-PUSCH-SetList-r16) associated with the second TRP.

Regarding the first and second TRP, the first and second TRP correspond to the first and second beam respectively, i.e., the UE 111 transmits the PUSCH repetition toward the first TRP using the first beam or the second TRP using the second beam.

Number of Bit for OL PC Parameter Set Indication in DCI:

If the DCI format (e.g. DCI formats 0_1/0_2) includes two open-loop power control parameter set indication fields and each corresponds to a separate SRI field, bit width for OL PC parameter set indication should be defined.

(1) The Same Number of Bits:

To simplify the determination of bit width for OL PC parameter set indication in DCI, in an embodiment of the invention, if the DCI format (e.g. DCI formats 0_1/0_2) of a DCI signal received by the UE includes two open-loop power control parameter set indication fields, each of which corresponds to a separate SRI field, bit width for two open-loop power control parameter set indication fields are the same. In detail, the bit width for each of the two open-loop power control parameter set indication fields is 0 when a higher layer parameter of a P0 value set list (e.g. p0-PUSCH-SetList-r16) is not configured. The bit width for each of the two open-loop power control parameter set indication fields is 1 when an SRI field is present in the DCI format (e.g. DCI formats 0_1/0_2). The bit width for these two fields is determined according to a higher layer parameter of OL PC parameter (e.g. olpc-ParameterSetDCI-0-1/ olpc-ParameterSetDCI-0-2) according to the DCI format that schedules the uplink transmission when no SRI field is present in the DCI format (e.g. DCI formats 0_1/0_2).

(2) Determining the Number of Bits Separately:

To determine bit width for two OL PC parameter set indication fields flexibly, in an embodiment of the invention, if the DCI format (e.g. DCI formats 0_1/0_2) of a DCI signal received by the UE includes two open-loop power control parameter set indication fields, each of which corresponds to a separate SRI field, a second higher layer parameters of OL PC parameter (e.g. the second olpc-ParameterSetDCI-0-1/ olpc-ParameterSetDCI-0-2) can be added to indicate the bit width of the second OL PC parameter set indication field, and the UE may determine bit width for the two open-loop power control parameter set indication fields separately. The two open-loop power control parameter set indication fields comprise a first open-loop power control parameter set indication field and a second open-loop power control parameter set indication field.

In detail, for a first one of the two open-loop power control parameter set indication fields, if the higher layer parameter of P0 value set list (e.g. p0-PUSCH-SetList-r16)

corresponding to the first OL PC parameter set indication field is not configured, bit width for the first one of the two open-loop power control parameter set indication fields (i.e. open-loop power control parameter set indication field) is 0. If a first SRI field is present in the DCI format (e.g. DCI formats 0_1/0_2), bit width for the first one of the two open-loop power control parameter set indication fields is 1. If the first SRI field is not present in the DCI format (e.g. DCI formats 0_1/0_2) and if the UE receives only one higher layer parameter of OL PC parameter (e.g. olpc-ParameterSetDCI-0-1/olpc-ParameterSetDCI-0-2), bit width for the first one of the two open-loop power control parameter set indication fields is determined according to the higher layer parameter of OL PC parameter (e.g. olpc-ParameterSetDCI-0-1/olpc-ParameterSetDCI-0-2) according to the DCI format that schedules the uplink transmission. If the UE receives two higher layer parameters of OL PC parameter (e.g. the first olpc-ParameterSetDCI-0-1/olpc-ParameterSetDCI-0-2 and the second olpc-Parameter-SetDCI-0-1/olpc-ParameterSetDCI-0-2), referred to as a first higher layer parameter of OL PC parameter and a second higher layer parameter of OL PC parameter, bit width for the first one of the two open-loop power control parameter set indication fields is determined according to the first higher layer parameter of OL PC parameter in the two higher layer parameters of OL PC parameter (e.g. the first olpc-ParameterSetDCI-0-1/olpc-ParameterSctDCI-0-2) according to the DCI format that schedules the uplink transmission.

For a second one of the two open-loop power control parameter set indication field, if the higher layer parameter of P0 value set list (e.g. p0-PUSCH-SetList-r16) corresponding to the second OL PC parameter set indication field is not configured, bit width for the second one of the two open-loop power control parameter set indication field (i.e. open-loop power control parameter set indication field) is 0. If a second SRI field is present in the DCI format (e.g. DCI formats 0_1/0_2), bit width for the second one of the two open-loop power control parameter set indication field is 1. If a second SRI field is not present in the DCI format (e.g. DCI formats 0_1/0_2) and if the UE receives only one higher layer parameter of OL PC parameter (e.g. olpc-ParameterSetDCI-0-1/olpc-ParameterSetDCI-0-2), bit width for the second one of the two open loop power control parameter set indication fields is determined according to the higher layer parameter of OL PC parameter (e.g. olpc-ParameterSetDCI-0-1/olpc-ParameterSetDCI-0-2) according to the DCI format that schedules the uplink transmission. If the UE receives two higher layer parameters of OL PC parameter, referred to as a first higher layer parameter of OL PC parameter and a second higher layer parameter of OL PC parameter, bit width for the second one of the two open-loop power control parameter set indication field is determined according to the second higher layer parameter of OL PC parameter in the two higher layer parameters of OL PC parameter (e.g. the second olpc-ParameterSetDCI-0-1/olpc-ParameterSetDCI-0-2) according to the DCI format that schedules the uplink transmission.

Figure 14:
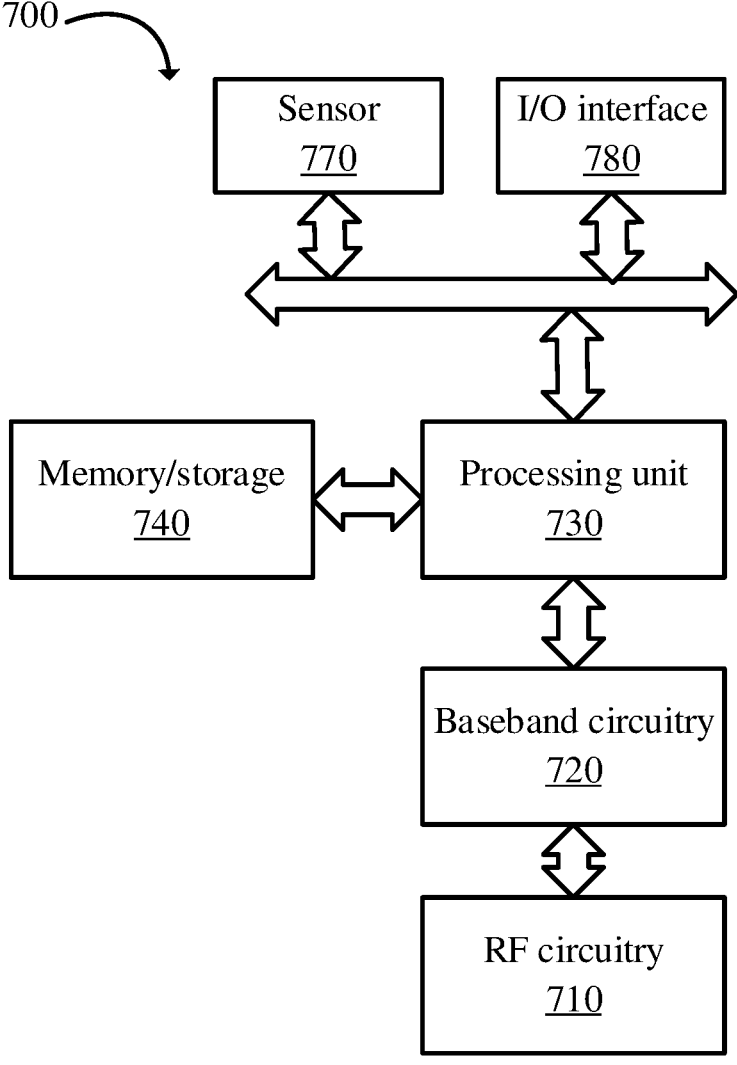
FIG. 14 illustrates a schematic view showing a system for wireless communication according to an embodiment of the present disclosure.

FIG. 14 is a block diagram of an example system 700 for wireless communication according to an embodiment of the present disclosure. Embodiments described herein may be implemented into the system using any suitably configured hardware and/or software. FIG. 14 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR. LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein. "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated into one processing unit, physically independent, or integrated into one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

An embodiment of the disclosure defines the PL-RS for CG and DG PUSCH.

An embodiment of the disclosure provides a method to update the mapping between SRI and PUSCH PL-RS.

An embodiment of the disclosure provides a method to determine the P0 value for open-loop power control.

An embodiment of the disclosure provides a method to determine bit width for open loop (OL) power control (PC) parameter indication field.

Regarding PUSCH PL-RS, the same PL-RS for the two TRPs cannot benefit from the increased diversity. The disclosure provides technical effects of obtaining PL-RSs for different TRPs separately. Regarding P0 value for open-loop power control, the same P0 value for the two TRPs cannot benefit from the increased diversity. The disclosure provides technical effects of obtaining P0 values for different TRPs separately. The disclosure realizes TRP specific power control.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. An uplink power control method executable in a user equipment (UE), comprising:

obtaining a first uplink transmission power for a first transmission and reception point (TRP) at least based on a first downlink pathloss estimate associated with a first pathloss reference signal (PL-RS) resource index; and obtaining a second uplink transmission power for a second TRP at least based on a second downlink pathloss estimate associated with a second PL-RS resource index, wherein the first uplink transmission power is obtained further based on a power P0 for the first TRP, and the second uplink transmission power is obtained further based on a power P0 for the second TRP, wherein when a DCI format of a DCI signal received by the UE includes one open-loop power control parameter set indication field, and a value of the open-loop power control parameter set indication field is '1', the P0 value corresponding to the first TRP is determined according to a first value in a higher layer parameter of a P0 value set of a first P0 value set list, wherein the P0 value set includes a P0 value set index mapped to an SRI value in a first SRI field; and the P0 value corresponding to the second TRP is determined according to a first value in a higher layer parameter of a P0 value set of a second P0 value set list, wherein the P0 value set includes a P0 value set index mapped to an SRI value in a second SRI field.

2. The uplink power control method of claim 1, wherein when a higher layer parameter of a configured UL grant is included in a configured grant configuration, the first PL-RS resource index corresponding to the first TRP is provided by a higher layer parameter of a first PL-RS index in the higher layer parameter of the configured UL grant of the configured grant configuration, and the second PL-RS resource index corresponding to the second TRP is provided by a higher layer parameter of a second PL-RS index in the higher layer parameter of the configured UL grant of the configured grant configuration.

3. The method of claim 2, wherein the first PL-RS index and the second PL-RS index are used to indicate dynamic switching between single-TRP based CG PUSCH transmission and multi-TRP based CG PUSCH transmission.

4. The uplink power control method of claim 1, wherein when a higher layer parameter of a configured UL grant is included in a configured grant configuration, the first PL-RS resource index corresponding to the first TRP is provided by a higher layer parameter of a first PL-RS index in the higher layer parameter of the configured UL grant of the configured grant configuration, and the second PL-RS resource index is an offset value starting from the first PL-RS resource index.

5. The uplink power control method of claim 4, wherein the offset value is preconfigured or configured by a radio resource control (RRC) signal, a medium access control (MAC) control element (CE), or downlink control information (DCI).

6. The uplink power control method of claim 1, wherein when a higher layer parameter of a configured UL grant is not included in a configured grant configuration, the first PL-RS resource index corresponding to the first TRP is provided by a higher layer parameter of a first PUSCH PL-RS index that is mapped to a higher layer parameter of a first SRI PUSCH PL-RS index in a higher layer parameter of a first SRI PUSCH mapping list, wherein the first SRI PUSCH PL-RS index is mapped to an SRI of a first SRI field; and the second PL-RS resource index corresponding to the second TRP is provided by a higher layer parameter of a second PUSCH PL-RS index that is mapped to a higher layer parameter of a second SRI PUSCH PL-RS index in a higher layer parameter of a second SRI PUSCH mapping list, wherein the second SRI PUSCH PL-RS index is mapped to an SRI of a second SRI field.

7. The uplink power control method of claim 1, wherein when a higher layer parameter of a configured UL grant is not included in a configured grant configuration, and only one SRI PUSCH mapping list is included in a higher layer parameter of a PUSCH PC information element (IE), the first PL-RS resource index corresponding to the first TRP is provided by a higher layer parameter of a first PUSCH PL-RS index mapped to a higher layer parameter of a first SRI PUSCH PC index being equal to 0, and the second PL-RS resource index corresponding to the second TRP is provided by a higher layer parameter of a second PUSCH PL-RS index mapped to a higher layer parameter of a second SRI PUSCH PC index being equal to 1.

8. The uplink power control method of claim 1, wherein when a higher layer parameter of a configured UL grant is not included in a configured grant configuration, and DCI does not include an SRI field, and two SRI PUSCH mapping lists are included in a higher layer, the first PL-RS resource index corresponding to the first TRP is provided by a higher layer parameter of a first PUSCH PL-RS index mapped to a higher layer parameter of a first SRI PUSCH PC index being equal to 0 in a higher layer parameter of a first SRI PUSCH mapping list and the second PL-RS resource index corresponding to the second TRP is provided by a higher layer parameter of a second PUSCH PL-RS index mapped to a higher layer parameter of a second SRI PUSCH PC index being equal to 0 in a higher layer parameter of a second SRI PUSCH mapping list.

9. The uplink power control method of claim 1, wherein the first PUSCH PL-RS resource index corresponding to the first TRP is the same as a PL-RS for an SRS resource set indicated by an SRI of a first SRI field, wherein the SRS resource set includes an SRS resource associated with PUSCH transmission targeting the first TRP, and the second PUSCH PL-RS resource index corresponding to the second TRP is the same as a PL-RS for an SRS resource set indicated by an SRI of a second SRI field, wherein the SRS resource set includes an SRS resource associated with the PUSCH transmission targeting the second TRP.

10. The uplink power control method of claim 1, wherein the first PUSCH PL-RS resource index corresponding to the first TRP is the same as a PL-RS for an SRS resource set with the lowest index, and the second PUSCH PL-RS resource index corresponding to the second TRP is the same as a PL-RS for an SRS resource set with the second lowest index.

11. The uplink power control method of claim 1, wherein when DCI does not include an SRI field, the first PUSCH PL-RS resource index corresponding to the first TRP is provided by a higher layer parameter of a first PUSCH PL-RS index mapped to a first SRI PUSCH PC index being equal to 0 in a higher layer parameter of a first SRI PUSCH mapping list, and the second PL-RS resource index $q_d$ corresponding to the second TRP is provided by a higher layer parameter of a second PUSCH PL-RS index mapped to a second SRI PUSCH PC index being equal to 0 in a higher layer parameter of a second SRI PUSCH mapping list.

12. The uplink power control method of claim 1, wherein the UE transmits PUSCH repetitions toward the first TRP using a first beam or the second TRP using a second beam.

13. The uplink power control method of claim 1, wherein when a DCI format of a DCI signal received by the UE does not include an SRI field, and the UE receives two higher layer parameters of a P0 value set list and only one OL PC parameter set indication field, the two P0 values for the first TRP and the second TRP are determined by a higher layer parameter of a P0 alpha value set or a higher layer parameter of a P0 value set of the P0 value set list according to indication in the same OL PC parameter set indication field.

14. The uplink power control method of claim 13, wherein when the value of open-loop power control parameter set indication field is '0' or '00', the P0 value corresponding to the first TRP is determined according to a value of a higher layer parameter of a first P0 alpha value set of a P0 alpha value set list, and the P0 value corresponding to the second TRP is determined according to a value of a higher layer parameter of a second P0 alpha value set of the P0 alpha value set list.

15. The uplink power control method of claim 14, wherein when the value of open-loop power control parameter set indication field is '1' or '01', the P0 value corresponding to the first TRP is determined according to a first value in the higher layer parameter of the P0 value set with the lowest P0 value set index in a first P0 value set list, and the P0 value corresponding to the second TRP is determined according to the first value in the higher layer parameter of the P0 value set with the lowest P0 value set index in a second P0 value set list.

16. The uplink power control method of claim 15, wherein when the value of open-loop power control parameter set indication field is '10', the P0 value corresponding to the first TRP is determined according to a second value in the higher layer parameter of the P0 value set with the lowest P0 value set index in the first P0 value set list, and the P0 value corresponding to the second TRP is determined according to the second value in the higher layer parameter of the P0 value set with the lowest P0 value set index in the second P0 value set list.

17. A chip, comprising:
   a processor, configured to call and run a computer program stored in a memory, to cause a device in which the chip is installed to execute any of the methods of claim 1.

18. A user equipment (UE), comprising:
a processer; and
a transceiver;
wherein the processor obtains a first uplink transmission power for a first transmission and reception point (TRP) at least based on a first downlink pathloss estimate associated with a first pathloss reference signal (PL-RS) resource index;
the processor obtains a second uplink transmission power for a second TRP at least based on a second downlink pathloss estimate associated with a second PL-RS resource index;
the processor directs the transceiver to transmit a first uplink transmission using the first uplink transmission power; and
the processor directs the transceiver to transmit a second uplink transmission using the second uplink transmission power,
wherein the first uplink transmission power is obtained further based on a power P0 for the first TRP, and the second uplink transmission power is obtained further based on a power P0 for the second TRP,
wherein when a DCI format of a DCI signal received by the UE includes one open-loop power control parameter set indication field, and a value of the open-loop power control parameter set indication field is '1', the P0 value corresponding to the first TRP is determined according to a first value in a higher layer parameter of a P0 value set of a first P0 value set list, wherein the P0 value set includes a P0 value set index mapped to an SRI value in a first SRI field; and
the P0 value corresponding to the second TRP is determined according to a first value in a higher layer parameter of a P0 value set of a second P0 value set list, wherein the P0 value set includes a P0 value set index mapped to an SRI value in a second SRI field.

* * * * *